(12) United States Patent
Fujimura

(10) Patent No.: US 7,735,463 B2
(45) Date of Patent: Jun. 15, 2010

(54) ENGINE AIR INTAKE ARRANGEMENT FOR A VEHICLE

(75) Inventor: Katsumi Fujimura, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 408 days.

(21) Appl. No.: 11/944,079

(22) Filed: Nov. 21, 2007

(65) Prior Publication Data

US 2008/0121449 A1    May 29, 2008

(30) Foreign Application Priority Data

Nov. 24, 2006    (JP) ............................. 2006-316455

(51) Int. Cl.
*F02M 35/10* (2006.01)

(52) U.S. Cl. .................................. 123/184.55; 123/579

(58) Field of Classification Search ............ 123/184.53, 123/184.55, 579, 583
See application file for complete search history.

(56) References Cited

FOREIGN PATENT DOCUMENTS

JP          56-002023          1/1981

*Primary Examiner*—Noah Kamen
(74) *Attorney, Agent, or Firm*—Rabin & Berdo, PC

(57) ABSTRACT

A vehicle having moving funnels separated from stationary funnels that suppresses any decrease in intake efficiency. The moving funnels are arranged on an intake side of the stationary funnels to lead air to an engine. A funnel holding section holds the moving funnels and includes opened holes. The moving funnels are moved straight between separated positions in which openings of the moving funnels are separated from openings of the stationary funnels, and abutment positions in which the openings of the moving funnels abut against the openings of the stationary funnels. The opened holes pass air on an upstream side to a downstream side.

16 Claims, 18 Drawing Sheets

ENGINE AIR INTAKE ARRANGEMENT FOR A VEHICLE

RELATED APPLICATIONS

This application claims the benefit of priority under 35 USC 119 of Japanese patent application no. 2006-316455, filed on Nov. 24, 2006, which application is hereby incorporated by reference in its entirety.

BACKGROUND OF THE INVENTION

1. Field of the Invention

The present invention relates to a vehicle, and more particularly to a vehicle having a funnel through which air is led to an intake port of an engine.

2. Description of Related Art

An intake device provided with an intake inertial pipe (funnel), through which air is led to an intake port of an engine, is known. JP-UM-A-56-2023, for example, discloses an intake device for internal combustion engines, comprising an intake inertial pipe including three stationary pipes (stationary funnels) fixed to an intake muffler (case section), three intermediate extension pipes (moving funnels), which are movable to slide on outer peripheries of the three stationary pipes, and three extension pipes (moving funnels), which are movable to slide on outer peripheries of the three intermediate extension pipes, a single flat-plate shaped flange section (funnel holding section), to which the three intermediate extension pipes are fixed, a single flat-plate shaped and horn-shaped suction section (funnel holding section), to which the three extension pipes are fixed, and a screw shaft (ball screw) for movement of the flat-plate shaped flange section and the flat-plate shaped and horn-shaped suction section. As the flat-plate shaped flange section and the flat-plate shaped and horn-shaped suction section of the intake inertial pipe are moved upon rotation of the screw shaft, the three intermediate extension pipes and the three extension pipes are slid on straight extensions of the three stationary pipes whereby the intake inertial pipe is changed in length. The three stationary pipes and the three intermediate extension pipes are structured not to separate from each other, and the three intermediate extension pipes and the three extension pipes are structured not to separate from each other.

In JP-UM-A-56-2023, however, the flange section (funnel holding section), to which the three intermediate extension pipes (moving funnels) are fixed, and the horn-shaped suction section (funnel holding section), to which the three extension pipes (moving funnels) are fixed, are in the form of a flat plate, so that flow of air in the intake muffler (case section) is liable to be obstructed. Therefore, when the flange section and the horn-shaped suction section, which are in the form of a flat plate and to which the moving funnels are fixed, are provided in an intake device constructed such that the moving funnels are separated from the stationary funnels, flow of air is obstructed by the flat-plate shaped flange section and the flat-plate shaped and horn-shaped suction section when air upstream of the moving funnels passes outside the moving funnels to the stationary funnels downstream of the moving funnels, in a state in which the moving funnels are separated from the stationary funnels, so that it is difficult to feed air smoothly to the stationary funnels. Consequently, there is a problem in that intake efficiency is decreased when the moving funnels are separated from the stationary funnels.

SUMMARY OF THE INVENTION

The invention solves this problem and provides a vehicle without a decrease in intake efficiency when a moving funnel is separated from a stationary funnel.

A vehicle according to one aspect of the invention comprises an engine having an intake port. A stationary funnel is provided through which air is led to the intake port. A moving funnel is arranged movably on an intake side of the stationary funnel and cooperates with the stationary funnel to lead air to the intake port. A funnel holding section holds the moving funnel and includes an air passage. The moving funnel is moved in a straight fashion between a first position in which an opening of the moving funnel is separated from an opening of the stationary funnel, and a second position in which the opening of the moving funnel abuts against the opening of the stationary funnel. The air passage of the funnel holding section passes air on an upstream side toward a downstream side.

As described above, the air passage of the funnel holding section passes air on an upstream side toward a downstream side, whereby air outside and upstream of the moving funnel is directed downstream to flow toward the stationary funnel when the opening of the moving funnel is separated from the opening of the stationary funnel. Thereby, flow of air from upstream to downstream of the funnel holding section is not obstructed, and intake efficiency is not decreased. Also, since the moving funnel moves straight between a first position separated from the stationary funnel and a second position abutting against the stationary funnel, flow of air passing through the moving funnel and drawn by the stationary funnel is straight even when the moving funnel is separated from the stationary funnel. Thereby, flow of air is not obstructed and intake efficiency is not decreased when the moving funnel is separated from the stationary funnel.

In one embodiment, the air passage of the funnel holding section comprises a hole or a notch opened in a direction of air flow. Air passing upstream of the moving funnel is thereby readily directed to flow downstream toward the stationary funnel.

In one embodiment, a plurality of stationary and moving funnels are provided. The funnel holding section includes a plurality of connections to which the plurality of moving funnels are connected, and the air passage is formed between the pluralities of connections. The connections to which the plurality of moving funnels are connected thereby readily forms an air passage, so that flow of air is not obstructed by the funnel holding section.

In one embodiment, an air filter section having an opening on the intake side of the stationary funnel is provided. The opening is provided along a direction in which an air passage of the stationary funnel extends, and in a position away from the funnel holding section. The funnel holding section spreads in a direction perpendicular to the opening of the air filter section, and in a direction in which the opening of the stationary funnel on the intake side spreads. Thereby, when the opening of the moving funnel is separated from the opening of the stationary funnel, air on an upstream side, which does not pass through the moving funnel after it passes the air filter section, passes through the air passage of the funnel holding section toward a downstream side on which the stationary funnel is positioned. Flow of air from upstream of the moving funnel to downstream is thus not obstructed, so that intake efficiency is not decreased when the moving funnel is separated from the stationary funnel.

In one embodiment, a first spindle extends straight in a direction in which air passages of the stationary funnels extend, and the funnel holding section includes a first insertion hole, into which the first spindle is inserted movably. The plurality of moving funnels are mounted to a plurality of funnel mount portions. The first insertion hole thereby moves along the first spindle, and the moving funnels held by the funnel holding section are moved in a straight fashion.

The plurality of connections may include a first connection to which the first insertion hole and the plurality of funnel mount portions are connected, and a second connection to which the plurality of adjacent funnel mount portions are connected, wherein the air passages are provided in a region surrounded by the first and second connections. The first connection thereby readily transmits movements of the first insertion hole when sliding along the first spindle to the funnel mount portions, so that the moving funnels are moved along the first spindle. The second connection readily compensates for stiffness of the first connection, so that the plurality of moving funnels are held in a stable state by the funnel holding section. Also, by providing the air passages in a region surrounded by the first and second connections, the air passages are readily provided.

In one embodiment, grooves extend in a direction of the first and second connections. The first and second connections are thereby notch-shaped in cross section such that a certain degree of stiffness is ensured while the first and second connections are reduced in cross sectional area. The funnel holding section is thereby lightened.

In one embodiment, the moving funnels, stationary funnels and funnel holding section are arranged in a case section. A second spindle is provided on the case section substantially in parallel to the first spindle. The funnel holding section further comprises a second insertion hole into which the second spindle is inserted. The funnel holding section is thereby supported by the second spindle as well as the first spindle, so that the funnel holding section and the moving funnels are inhibited from rotating about the first spindle.

The second spindle may be provided integrally on the case section. The number of parts is thereby less relative to the case where the second spindle is provided separately on the case section.

The case section may comprise an upper and lower case section. By dividing the case section into upper and lower sections, the moving funnels, stationary funnels, and funnel holding section are readily arranged in the case section.

The case section may comprise an upper stopper portion for stopping the moving funnels in the first position, and the funnel holding section may comprise an upper abutment on a side of the first insertion hole toward the upper case section to abut against the upper stopper portion when the moving funnels are positioned in the first position. The moving funnels are thereby readily stopped in the first position by the upper stopper portion and the upper abutment.

In one embodiment, a drive source drives the funnel holding section, and upper and lower spring members are arranged between the funnel holding section and the drive source. The upper spring member is compressed when the upper abutment of the funnel holding section abuts against the upper stopper portion, and the lower spring member is compressed when the openings of the moving funnels abut the openings of the stationary funnels. Thereby, when the drive source moves the funnel holding section such that its upper abutment abuts the upper stopper portion, the upper spring material is compressed to readily absorb the assembling error of the drive source and the funnel holding section and the driving error of the drive source. Also, when the drive source moves the funnel holding section downward such that openings of the moving funnels abut openings of the stationary funnels, the lower spring material is compressed to readily absorb the assembling error of the drive source and the funnel holding section and the driving error of the drive source.

In on embodiment, the drive source includes a drive shaft. A turning lever has one end connected to the drive shaft and moves the first insertion hole of the funnel holding section along the first spindle. A moving member is arranged between the turning lever and the funnel holding section and includes an engagement for engagement with the turning lever. The turning lever includes a support having a slide surface that supports the engagement slidably. The drive shaft turns the turning lever to move the moving member and slide the engagement relative to the turning lever when the moving funnels are moved between the first and second positions. The first insertion hole of the funnel holding section is thereby moved straight along the first spindle.

In one embodiment, a throttle body is arranged between the intake port of the engine and an opening of the stationary funnel. An air passage of the moving funnel, an air passage of the stationary funnel, and an air passage of the throttle body, are formed substantially straight and are connected. Air passing to the intake ports of the engine from the moving and stationary funnels thereby flows straight, so that air flow is not obstructed and intake efficiency is not decreased.

In one embodiment, where a plurality of moving funnels, a plurality of stationary funnels, and the funnel holding section are arranged in a case section, a plurality of cylinder heads are mounted to a plurality of cylinders of the engine to provide a V-shaped space above the engine. The case section is arranged above the V-shaped space. With such construction, intake ports of the engine are normally provided in the V-shaped space, so that the openings of the stationary funnels toward the engine are provided straight toward the intake ports of the engine.

In one embodiment, an air filter section is arranged rearwardly of the case section in a travel direction, and a duct section is provided through which air is caused to flow into the case section from rearward in the travel direction. The duct section forms a passage, through which air flows into the case section from rearward in the travel direction, so that air is readily fed to the air filter section, which is arranged rearward in the travel direction, and air cannot easily pass directly thereinto.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the invention is now described with reference to the drawings.

Figure 1:
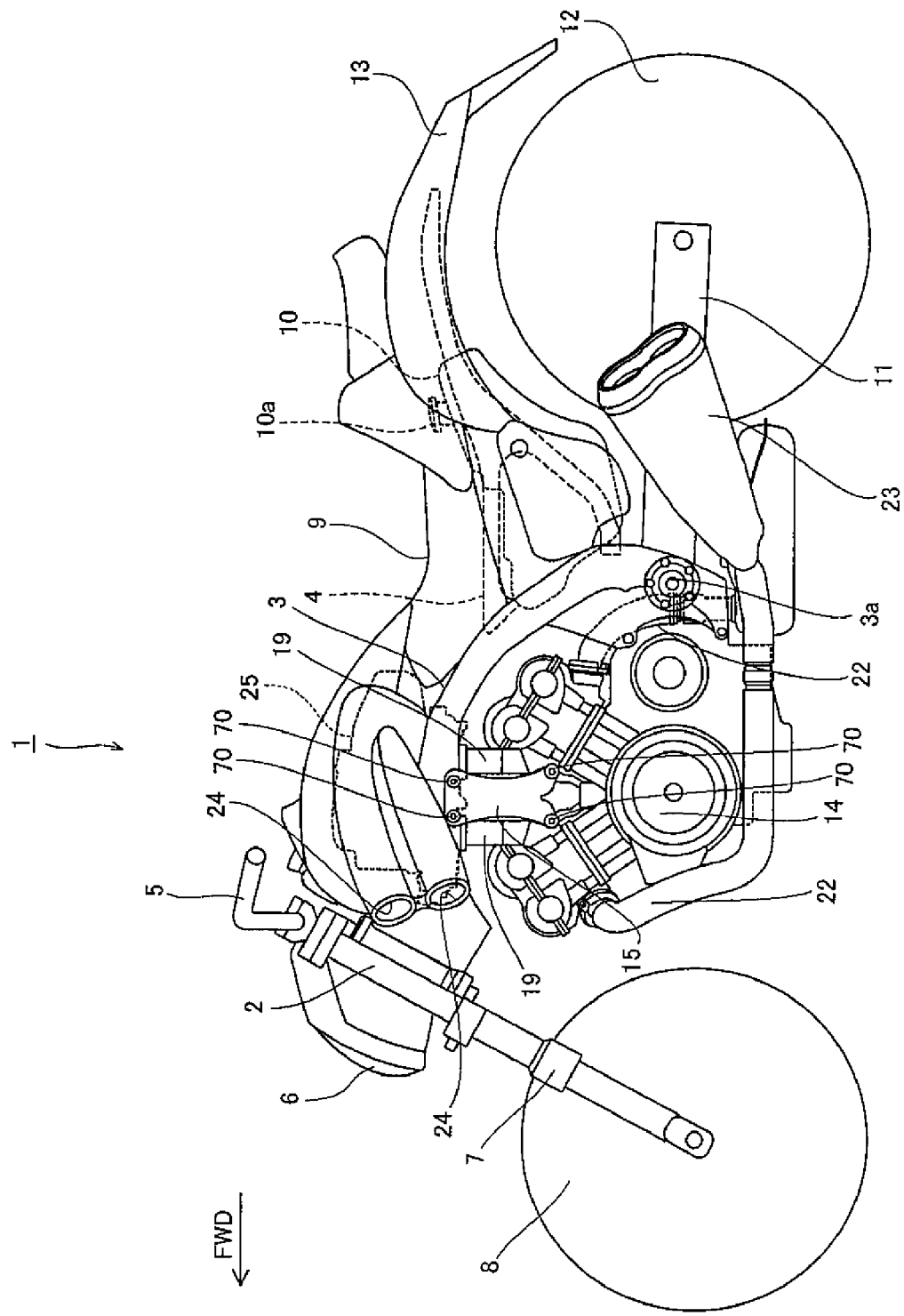
FIG. 1 is a side view of a motorcycle according to an embodiment of the invention.

FIG. 1 is a side view of a motorcycle 1 according to an embodiment of the invention. FIGS. 2-18 illustrate, in detail, a construction of a funnel of motorcycle 1. Motorcycle 1 is an example of a vehicle according to the invention. In the drawings, an arrow FWD indicates the front in a travel direction of motorcycle 1.

In motorcycle 1, a main frame 3 extending longitudinally is arranged rearwardly of a head pipe 2. A rear frame 4 extending rearwardly upward is connected to a rear portion of main frame 3. Head pipe 2, main frame 3 and rear frame 4 constitute a body frame.

A handle 5 is mounted to an upper portion of head pipe 2 to be able to turn. A headlamp 6 is provided forwardly of head pipe 2. A pair of front forks 7 having suspensions for absorbing vertical shock are arranged on a lower portion of head pipe 2. A front wheel 8 is mounted rotatably to lower ends of front forks 7.

A seat 9 is arranged above the rear portion of main frame 3. A fuel tank 10 made of a resin and provided with an oil filler port 10a is arranged below seat 9. A pivot shaft 3a is provided at a rear end (lower portion) of main frame 3. A front end of a rear arm 11 is supported by pivot shaft 3a to be able to swing vertically. A rear wheel 12 is mounted rotatably to a rear end of rear arm 11. A rear fender 13 covers an upper portion of rear wheel 12.

Figure 4:
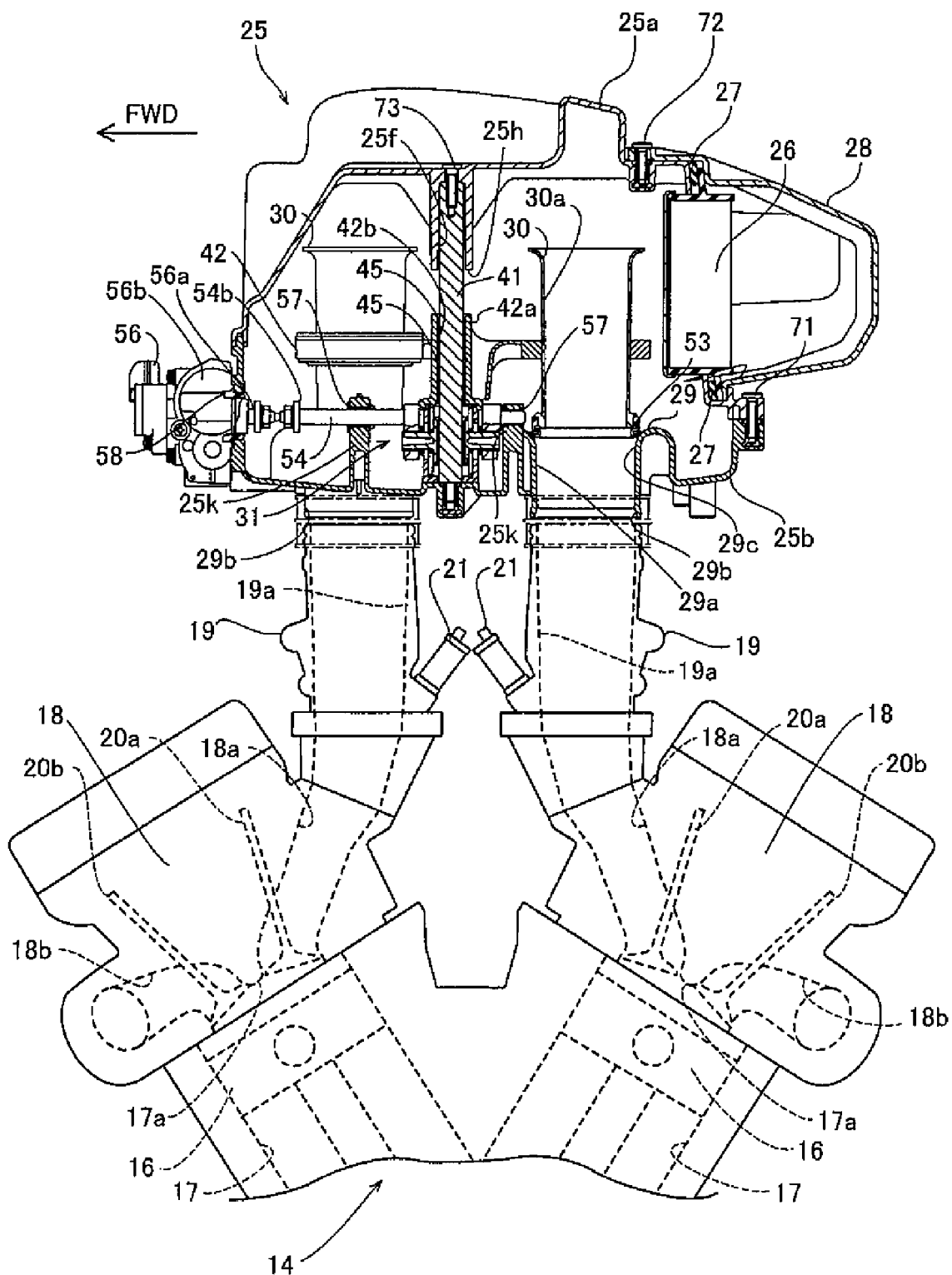
FIG. 4 is a partial, cross sectional view of a neighborhood of the funnels and an engine of the motorcycle of FIG. 1.

An engine 14 is arranged below and fixed to main frame 3 by a fixation member 15 and screw members 70. Engine 14 comprises, as shown in FIG. 4, pistons 16, cylinders 17, cylinder heads 18 and throttle bodies 19. While only two cylinders 17 are shown in FIG. 4, engine 14 includes four cylinders. Engine 14 is a V-type four-cylinder engine, in which two front cylinders 17 (cylinder heads 18) and two rear cylinders 17 (cylinder heads 18) are arranged to provide a V-shaped space above engine 14. Pistons 16 are arranged in cylinders 17 and cylinder heads 18 are arranged to close openings of cylinders 17. Cylinder head 18 is formed with an intake port 18a and an exhaust port 18b. Intake port 18a permits a mixture of air and fuel to be supplied to a combustion chamber 17a of cylinder 17. Exhaust port 18b permits discharge of residual gases after combustion from combustion chamber 17a. An intake valve 20a and an exhaust valve 20b are arranged in intake port 18a and exhaust port 18b. Throttle body 19 is mounted to an opening of intake port 18a and an air passage 19a inside throttle body 19 is substantially straight. An injector 21 is mounted to throttle body 19 to jet fuel into intake port 18a. An exhaust pipe 22 (FIG. 1) is mounted to an opening of exhaust port 18b and a muffler 23 is connected to exhaust pipe 22.

Figure 3:
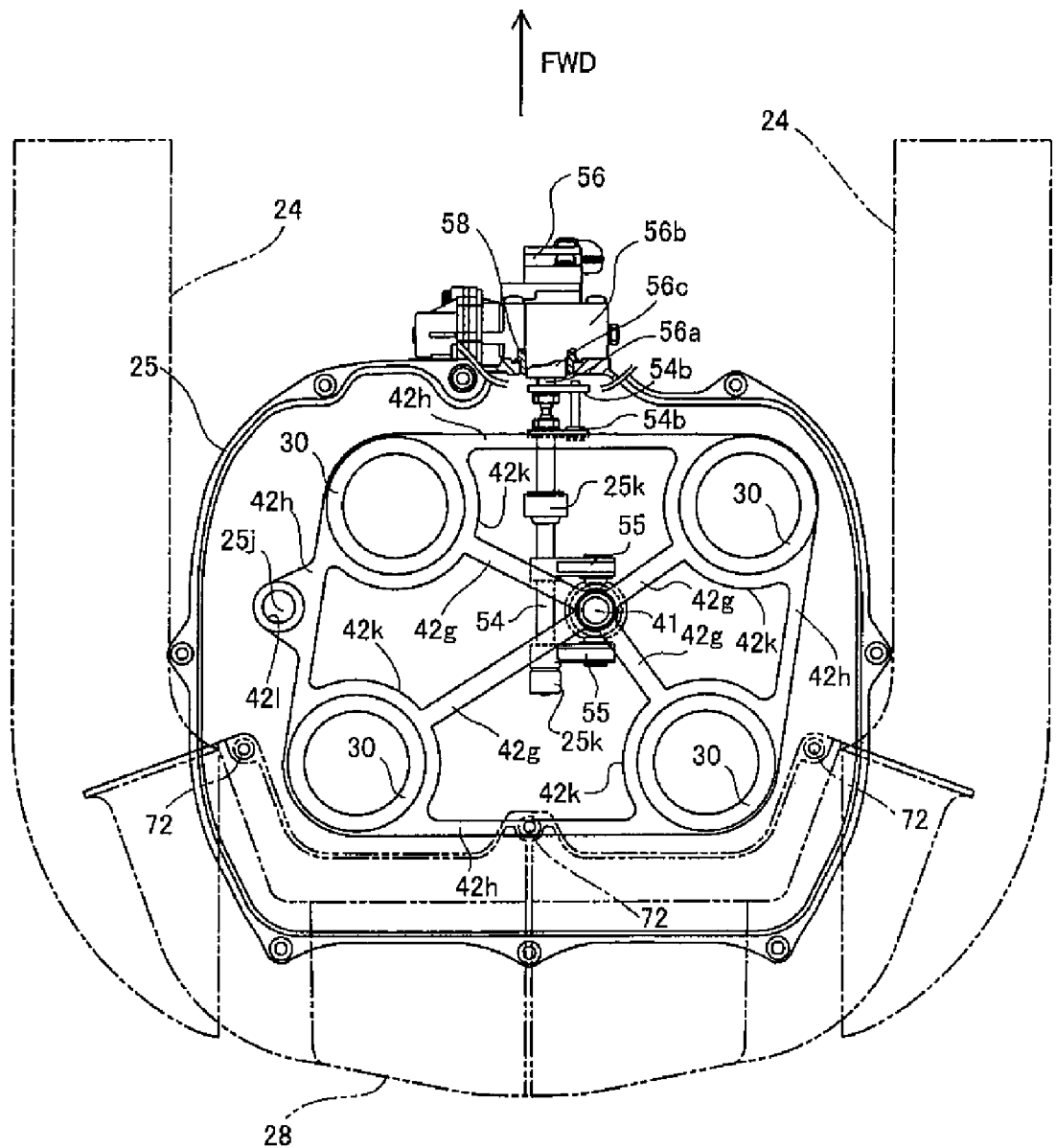
FIG. 3 is a plan view of a neighborhood of the funnels of the motorcycle of FIG. 1.

Intake ducts 24 are provided above engine 14 and on both left and right sides of motorcycle 1 as shown in FIGS. 1 and 3. As shown in FIGS. 1 and 4, a cleaner box 25 is arranged between intake ducts 24 to be supplied with air from intake ducts 24.

Figure 5:
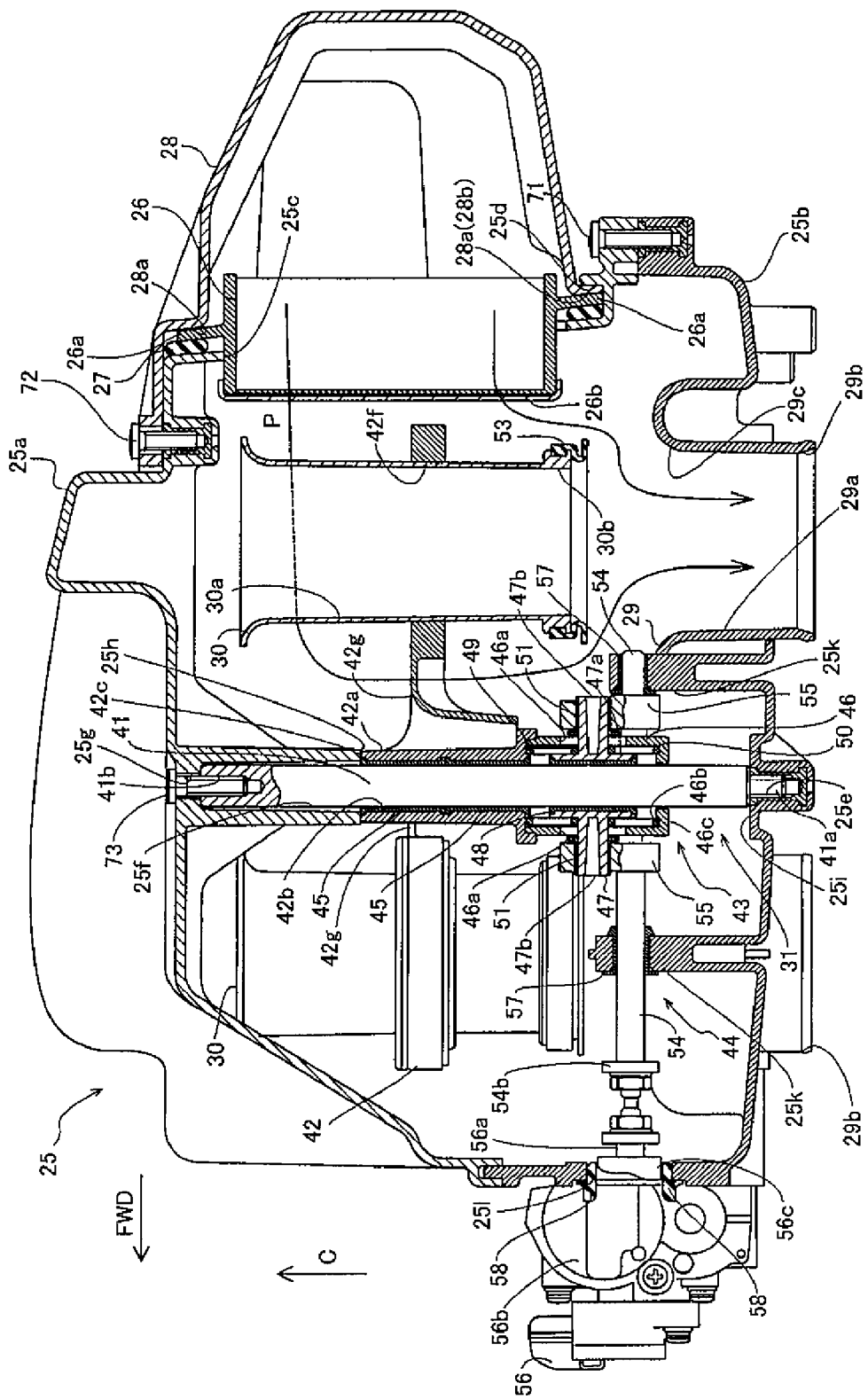
FIG. 5 is a cross sectional view showing a state in which moving funnels of the motorcycle of FIG. 1 are moved to separated positions.

Cleaner box 25 is arranged above the V-shaped space of engine 14. Thereby, the opening of intake port 18a is provided in the V-shaped space, so that throttle body 19, through which air being led to intake port 18a passes, can be provided straight downward toward intake port 18a of engine 14 from cleaner box 25 (upper side). Cleaner box 25 is an example of a "case section" of the invention and, as shown in FIG. 5, includes an upper cleaner box 25a and a lower cleaner box 25b. Upper cleaner box 25a is an example of an "upper case section" and lower cleaner box 25b is an example of a "lower case section" of the invention. Upper and lower cleaner boxes 25a and 25b are fixed by screw members 71, as shown in FIG. 4.

An air filter section 26 for purification of air supplied from intake ducts 24 covers an opening 25c provided rearwardly of upper cleaner box 25a in the travel direction (direction of arrow FWD). A packing 27 made of sponge is provided between a periphery of opening 25c and a flange portion 26a of air filter section 26. Packing 27 inhibits air from entering and outgoing from a gap between upper cleaner box 25a and flange portion 26a of air filter section 26. A duct section 28 is arranged rearwardly of upper cleaner box 25a and air filter section 26 to cover rear portions of upper cleaner box 25a and air filter section 26. Packing 27 and flange portion 26a of air filter section 26 are interposed between a holding portion 28a of duct section 28 and upper cleaner box 25a. A lower portion 28b of holding portion 28a, together with packing 27 and flange portion 26a, are engaged by an engagement 25d on a rear and lower portion of upper cleaner box 25a. An upper portion of duct section 28 is fixed to upper cleaner box 25a by a screw member 72.

As shown in FIG. 3, duct section 28 causes air supplied from intake ducts 24 to inflow in the travel direction (direction of arrow FWD) and leads the inflowed air to a rear portion of cleaner box 25, in which air filter section 26 is arranged. That is, duct section 28 causes air supplied from intake ducts 24 to flow into cleaner box 25 through air filter section 26 from rearward in the travel direction.

Figure 2:
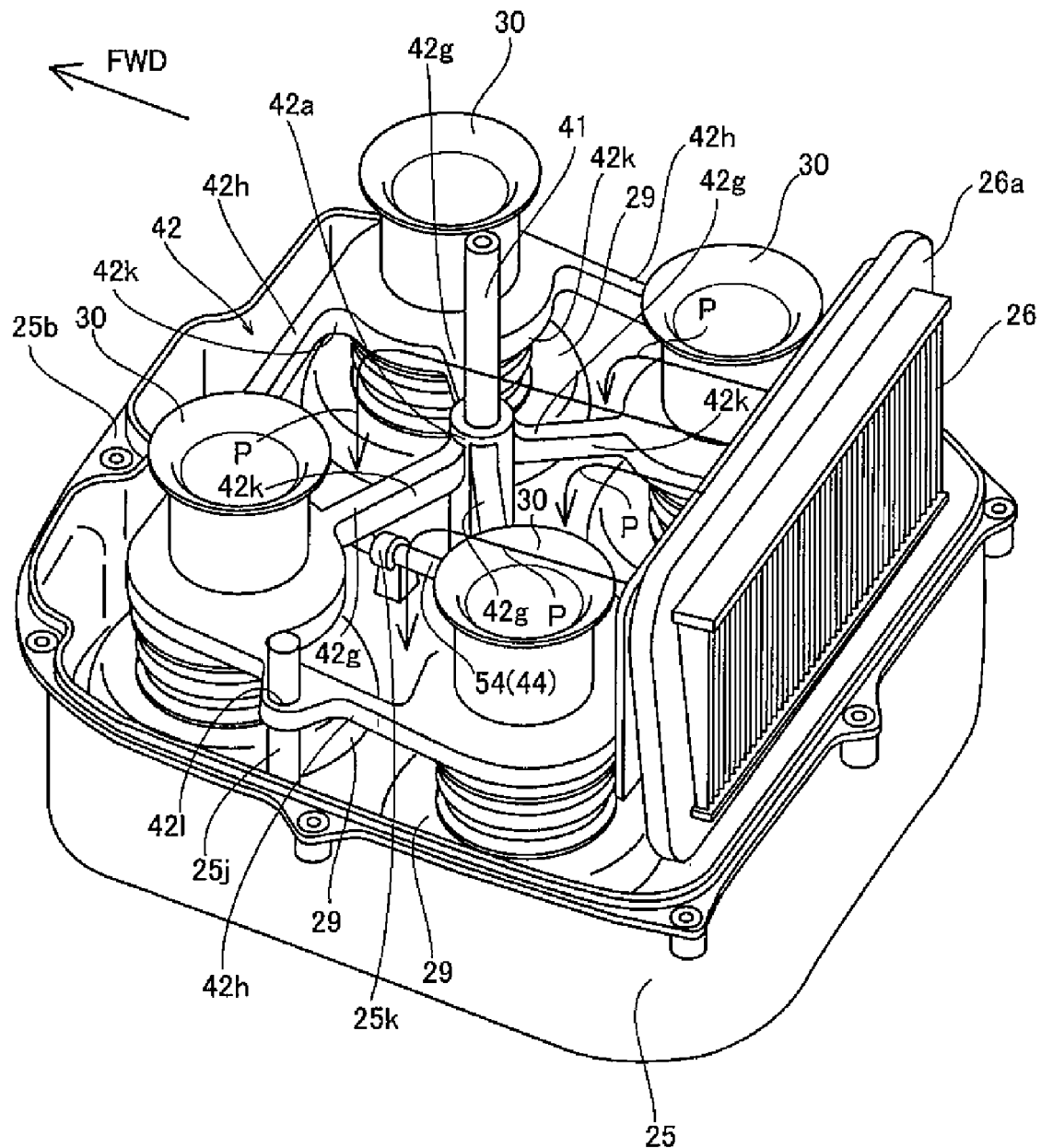
FIG. 2 is a perspective view of a neighborhood of funnels of the motorcycle of FIG. 1.

As shown in FIGS. 2 and 5, stationary funnels 29, moving funnels 30 and a funnel moving mechanism 31 are provided in cleaner box 25. Stationary funnels 29 and moving funnels 30 are provided one by one for each cylinder 17 (see FIG. 4) of engine 14. Stationary funnels 29 are integral with lower cleaner box 25b of cleaner box 25, as shown in FIG. 5, and air passages 29a inside stationary funnels 29 are substantially straight. Stationary funnels 29 lead air purified in cleaner box 25 to intake ports 18a.

Moving funnels 30 are arranged on an intake side of stationary funnels 29 and air passages 30a inside moving funnels 30 are substantially straight. Moving funnels 30 and stationary funnels 29 lead air purified in cleaner box 25 to intake ports 18a. Lower throttle body connections 29b of stationary funnels 29 positioned outside cleaner box 25 are connected to upper portions of throttle bodies 19. Throttle body connections 29b connect stationary funnels 29 and throttle bodies 19 substantially straight. That is, air passages 30a of moving funnels 30, air passages 29a of stationary funnels 29, and air passages 19a of throttle bodies 19 are formed and connected substantially straight.

Figure 6:
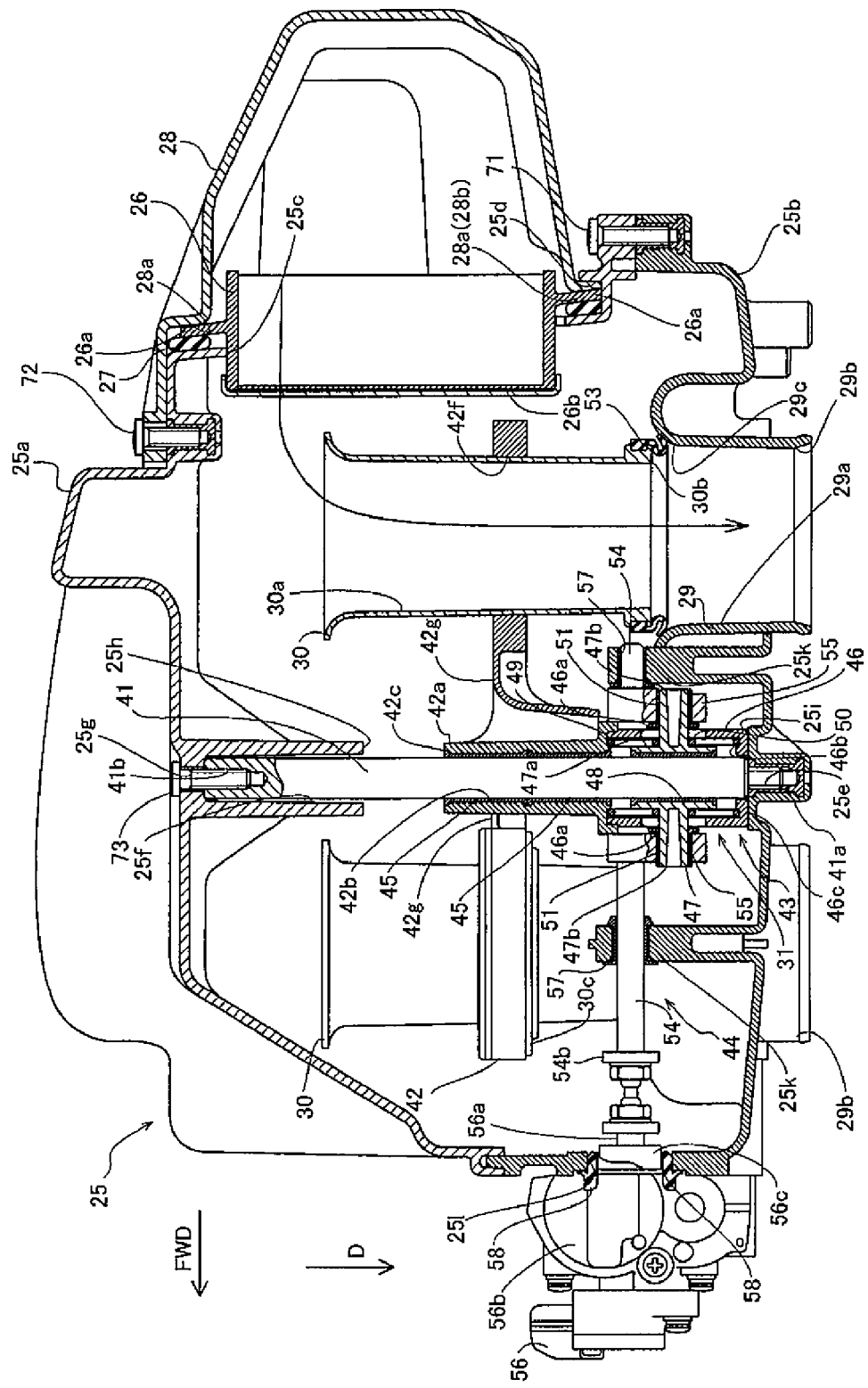
FIG. 6 is a cross sectional view showing a state in which the moving funnels of the motorcycle of FIG. 1 are moved to abutment positions.

As shown in FIGS. 5 and 6, moving funnels 30 are movable between separated positions (a state in FIG. 5), in which openings 30b are separated from openings 29c of stationary funnels 29 on an intake side, and abutment positions (a state in FIG. 6), in which openings 30b of moving funnels 30 abut against openings 29c of stationary funnels 29. When moving funnels 30 are moved to the separated positions (FIG. 5), intake pipes connected to cylinders 17 from cleaner box 25 are constituted by stationary funnels 29, throttle bodies 19, and intake ports 18a. On the other hand, when moving funnels 30 are moved to the abutment positions (FIG. 6), intake pipes connected to cylinders 17 from cleaner box 25 are constituted by moving funnels 30, stationary funnels 29, throttle bodies 19, and intake ports 18a. Funnel moving mechanism 31 moves moving funnels 30 straight between the separated and abutment positions. The separated and abutment positions, respectively, are examples of "first position" and "second position" in the invention.

Figure 7:
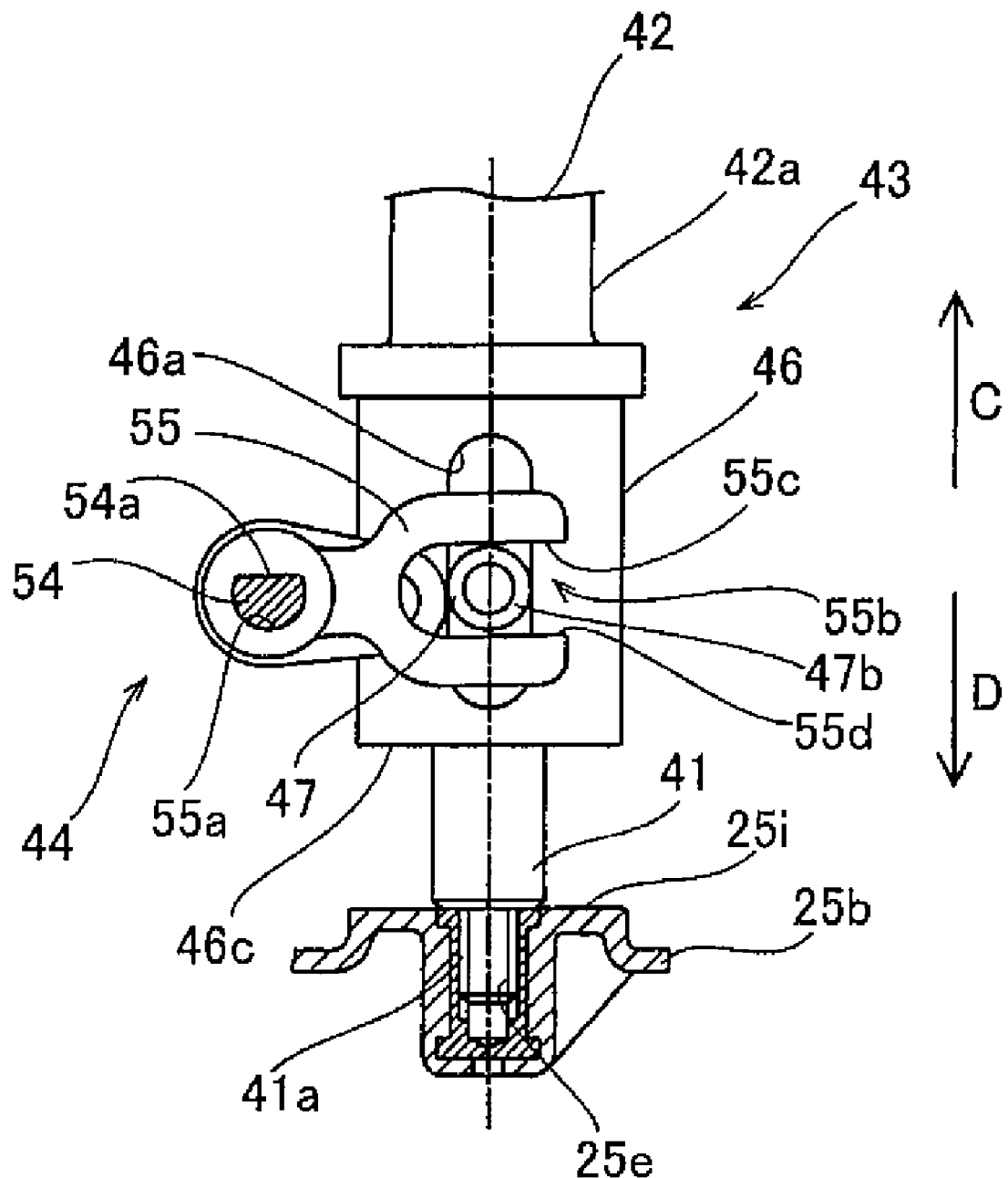
FIG. 7 is a front view showing a state in which lever members of the motorcycle of FIG. 1 are engaged by a moving member.

As shown in FIG. 5, funnel moving mechanism 31 includes a metallic spindle 41 extending straight, a funnel holding section 42 made of a resin to hold moving funnels 30, a moving member 43, and a turning lever 44 (see FIG. 7). Spindle 41 is an example of a "first shaft" and turning lever 44 is an example of "turning lever" of the invention.

A male thread portion 41a is provided on one end side (lower side) of metallic spindle 41 and a female thread portion 41b is provided on the other end side (upper side). Male thread portion 41a is screwed into a threaded portion 25e on an inner bottom surface of lower cleaner box 25b. The other end side (upper side) of spindle 41 is inserted into a shaft inserted portion 25f on an inner, upper surface of upper cleaner box 25a to project inside cleaner box 25 in a cylindrical manner. A screw inserted hole portion 25g is provided on an upper portion of shaft inserted portion 25f to correspond to female thread portion 41b of spindle 41. A screw member 73 is inserted into screw inserted hole portion 25g from outside upper cleaner box 25a and is screwed into female thread portion 41b of spindle 41 inserted into shaft inserted portion 25f.

Funnel holding section 42 spreads in a direction perpendicular to an opening 26b of air filter section 26, and in a direction in which openings 29c of stationary funnels 29 on an intake side spread. A main insertion hole 42b is provided on an inner surface of a cylindrical portion 42a of funnel holding section 42. Main insertion hole 42b is an example of a "first insertion hole" of the invention. A bush 45 is fitted into main insertion hole 42b, and an inner peripheral surface of bush 45 is fitted slidably onto the outer peripheral surface of spindle 41. That is, the inner peripheral surface of bush 45 slides on the outer peripheral surface of spindle 41 extending straight, whereby main insertion hole 42b of funnel holding portion 42 and spindle 41 function to move moving funnels 30 held by funnel holding portion 42 in a straight fashion between separated positions and abutment positions. An upper abutment 42c at an upper end of cylindrical portion 42a of funnel holding section 42 can abut against an upper stopper portion 25h of shaft inserted portion 25f of upper cleaner box 25a to stop funnel holding section 42 at a predetermined level. When upper abutment 42c abuts against upper stopper portion 25h, openings 30b of moving funnels 30 facing stationary funnels 29 are moved to separated positions apart from openings 29c of stationary funnels 29 on the intake (upstream) side (see, e.g., FIG. 5).

As shown in FIGS. 5 and 7, a cylindrical-shaped part receiving portion 46 of moving member 43 is mounted to a lower end 42d (see FIG. 9) of cylindrical portion 42a of funnel holding section 42. Moving member 43 includes, as shown in FIG. 5, a slide member 47 made of a resin, a bush 48, an upper spring material 49 composed of a compression spring, and a lower spring material 50 composed of a compression spring. Upper spring material 49 is an example of an "upper spring member" and lower spring material 50 is an example of a "lower spring member" of the invention. Two cylindrical-shaped projections 47b project in a substantially perpendicular fashion from mutually opposite sides of cylindrical-shaped body portion 47a of slide member 47 received in part receiving portion 46. Projections 47b are an example of an "engagement" of the invention. Bushes 51 are fitted onto outer peripheral surfaces of projections 47b. Slots 46a are formed in regions of part receiving portion 46 corresponding to projections 47b and have a predetermined length substantially in parallel to the direction in which slide member 47 moves relative to spindle 41 (i.e., the direction of arrows C and D of FIG. 7).

Slots 46a permit projections 47b to project outside part receiving portion 46 and to move when slide member 47 moves on spindle 41. Bush 48 is fitted onto an inner peripheral surface of body portion 47a of slide member 47, and an inner peripheral surface of bush 48 is fitted slidably onto the outer peripheral surface of spindle 41. Lower spring material 50 is fitted onto a portion of body portion 47a of slide member 47 below projections 47b. An upper side of lower spring material 50 abuts against projections 47b and a lower side of lower spring material 50 abuts against a spring bearing portion 46b of part receiving portion 46. Upper spring material 49 is fitted onto a side of body portion 47a above projections 47b. A lower side of upper spring material 49 abuts against projections 47b and an upper side of lower spring material 50 abuts against a lower surface 42e (see FIG. 9) of cylindrical portion 42a, to which part receiving portion 46 is mounted.

A lower abutment 46c capable of abutting against a lower stopper portion 25i adjacent to threaded portion 25e of lower cleaner box 25b is provided at a lower end of part receiving portion 46 (FIGS. 6 and 7). A distance over which lower abutment 46c travels to abut against lower stopper portion 25i is set to be a little larger than a distance over which openings 30b of moving funnels 30 travel to abut against openings 29c of stationary funnels 29. That is, openings 30b of moving funnels 30 abut against openings 29c of stationary funnels 29 before lower abutment 46c abuts against lower stopper portion 25i. The abutment of part receiving portion 46c against lower stopper portion 25i inhibits moving funnels 30 from moving further toward stationary funnels 29 after openings 30b have moved to abutment positions against openings 29c.

Figure 8:
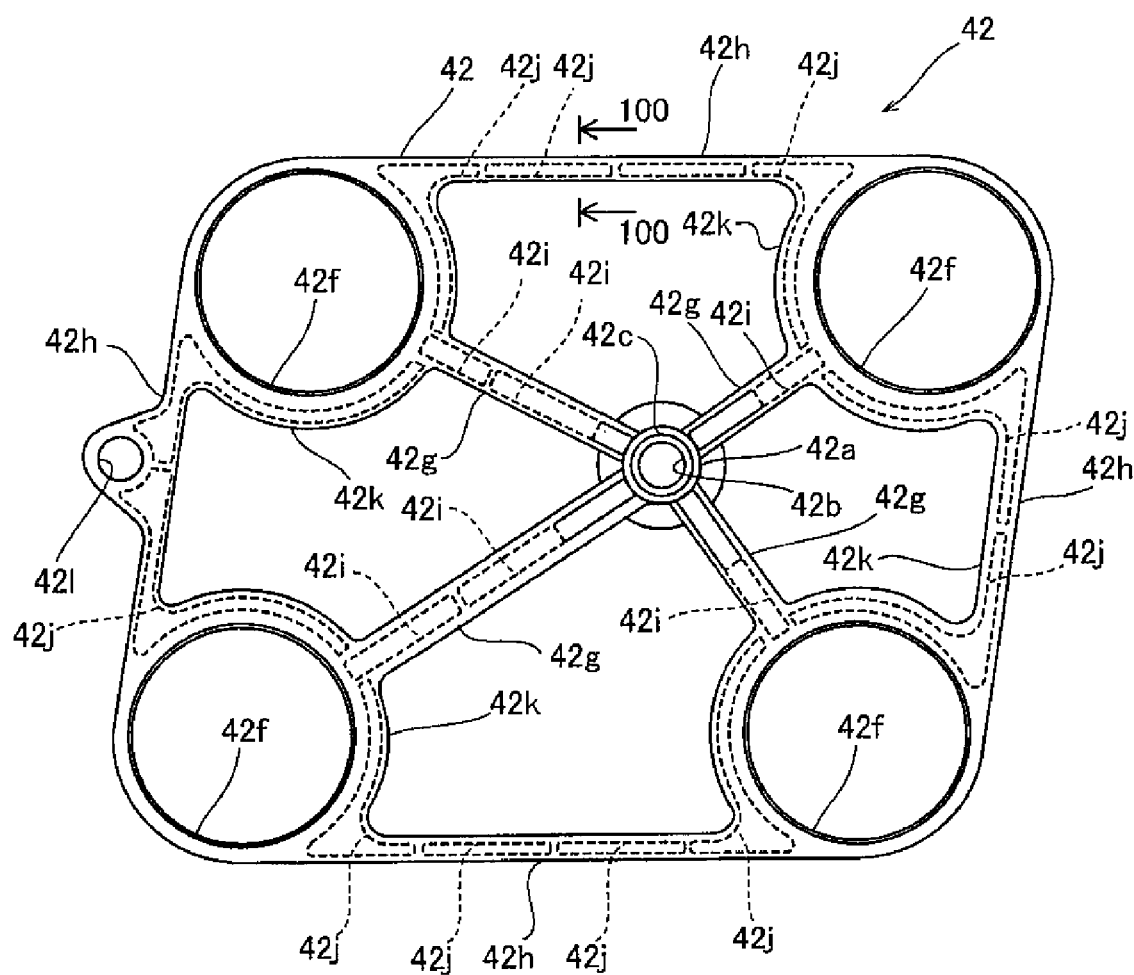
FIG. 8 is a plan view of a funnel holding section of the motorcycle of FIG. 1.
Figure 9:
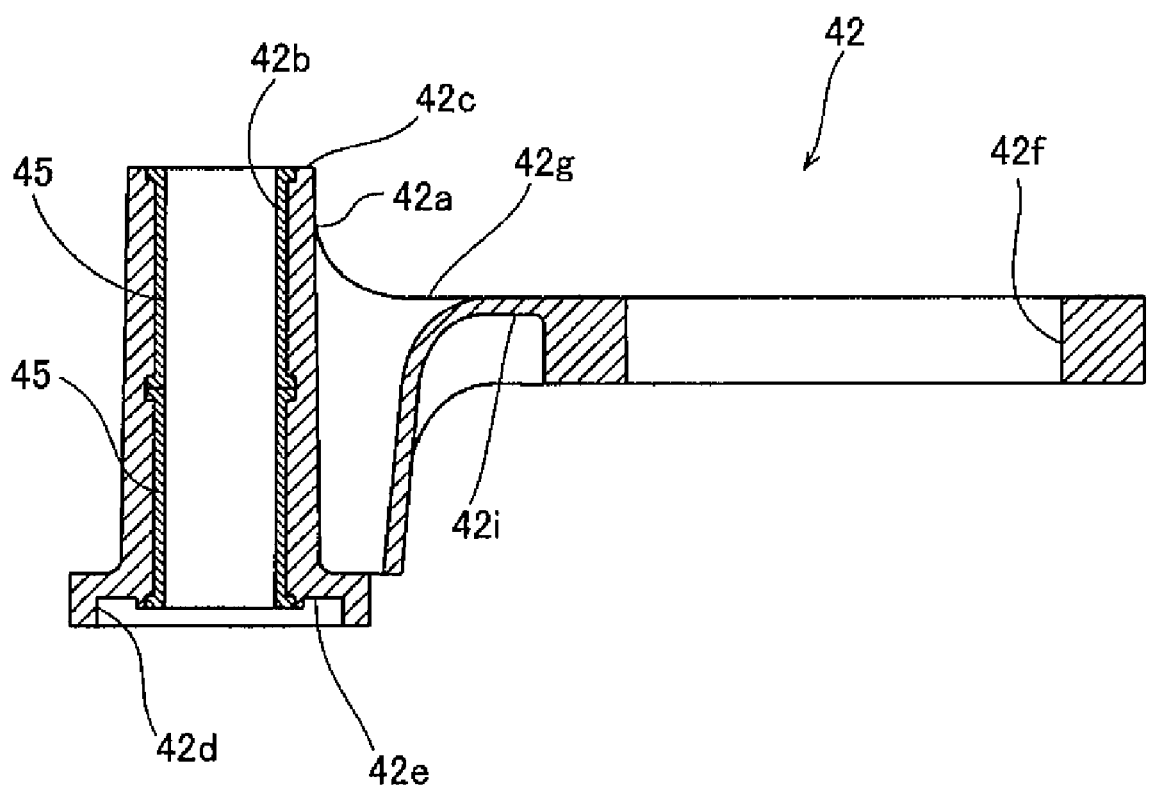
FIG. 9 is a cross sectional view of the funnel holding section of the motorcycle of FIG. 1.
Figure 10:
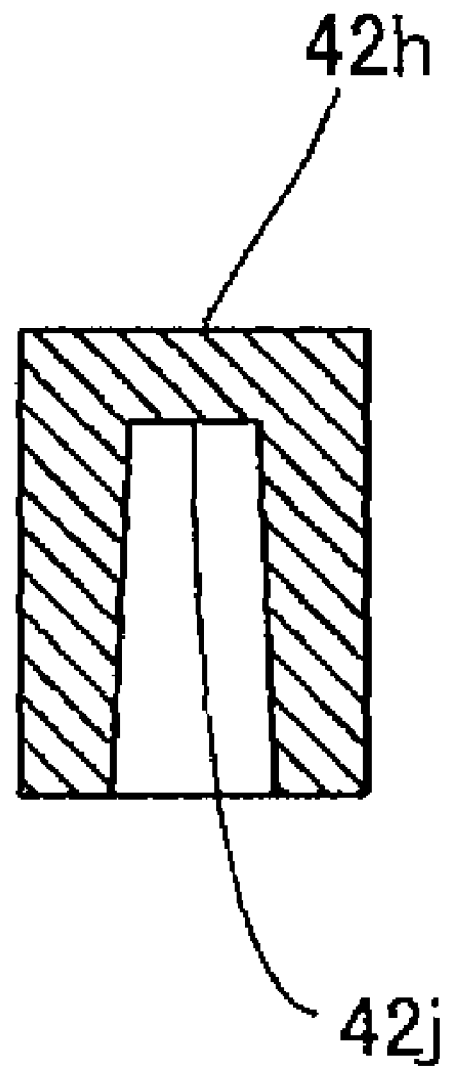
FIG. 10 is a cross sectional view taken along line 100-100 of FIG. 8.

As shown in FIGS. 2 and 8, first connection arm portions 42g are formed in a rod-shaped manner on cylindrical portion 42a surrounding main insertion hole 42b to connect cylindrical portion 42a and funnel mount portions 42f, to which moving funnels 30 are mounted. First connection arm portions 42g are examples of a "connection" and a "first connection" of the invention. First connection arm portions 42g transmit movements of cylindrical portion 42a to funnel mount portions 42f when main insertion hole 42b (bush 45) slides along spindle 41. Second connection arm portions 42h are formed in a rod-shaped manner between adjacent funnel mount portions 42f to connect adjacent funnel mount portions 42f (moving funnels 30). Second connection arm portions 42h are examples of a "connection" and a "second connection" of the invention. Second connection arm portions 42h compensate for stiffness of first connection arm portions 42g. A plurality of grooves 42i are provided on undersides of the first connection arm portions 42g substantially in parallel to directions in which first connection arm portions 42g extend. A plurality of grooves 42j are similarly provided on undersides of second connection arm portions 42h substantially in parallel to directions in which second connection arm portions 42h extend. Grooves 42i, 42j function to lighten first and second connection arm portions 42g and 42h.

First and second connection arm portions 42g and 42h define four perforated opened holes 42k permitting air above (upstream side) funnel holding section 42 to pass downward (downstream side). Opened holes 42k are an example of an "air passage" of the invention. When openings 30b of moving funnels 30 are separated from openings 29c of stationary funnels 29 (FIG. 5), opened holes 42k permit passage of air in a direction of arrow P from an upstream side, which does not pass through moving funnels 30 but is purified after passing through air filter section 26, to a downstream side on which stationary funnels 29 are positioned. That is, first and second connection arm portions 42g and 42h connect funnel holding section 42, which holds moving funnels 30, to define large opened holes 42k that permit air flowing outside moving funnels 30 to easily flow downward.

As shown in FIGS. 3 and 8, a sub-insertion hole 42l is formed in the second connection arm portion 42h most distant from spindle 41 (main insertion hole 42b). Sub-insertion hole 42l is an example of a "second insertion hole" of the invention. As shown in FIG. 2, sub-insertion hole 42l is provided integrally on an underside of lower cleaner box 25b and a sub-spindle 25j extending substantially in parallel to spindle 41 is inserted slidably into sub-insertion hole 42l. Sub-spindle 25j is an example of a "second spindle" of the invention. Sub-insertion hole 42l and sub-spindle 25j inhibit funnel holding section 42 and moving funnels 30 from turning about spindle 41 when funnel holding section 42 moves.

Funnel mount portions 42f are circumferential in shape, as shown in FIG. 6. Moving funnels 30 are mounted to funnel mount portions 42f.

As shown in FIGS. 5 and 6, rubber lips 53 are mounted to ends of moving funnels 30 adjacent stationary funnels 29. Rubber lips 53 fill gaps between moving funnels 30 and stationary funnels 29 when openings 30b abut against openings 29c.

As shown in FIG. 5, turning lever 44 includes a metallic turning shaft 54 in the form of a round rod and two lever members 55 (see FIG. 7) made of a resin. The round rod and lever members 55 are formed integrally. That is, turning-shaft insertion holes 55a of lever members 55 are mounted to turning shaft 54 by means of insert molding. Flat portions 54a are provided on those portions of turning shaft 54 to which turning-shaft insertion holes 55a are mounted. Flat portions 54a inhibit lever members 55 from idling relative to turning shaft 54 when turning shaft 54 turns.

As shown in FIG. 5, one end of turning shaft 54 is connected at connection 54b to a drive shaft 56a of a motor 56. An intermediate portion of turning shaft 54 between connection 54b and the other end of turning shaft 54 is supported rotatably by bearings 57 fitted into shaft supports 25k, which project upward from an underside of lower cleaner box 25b.

As shown in FIG. 7, lever members 55 of turning lever 44 engage projections 47b of slide member 47. An engagement support 55b of lever member 55 engages slidably with projection 47b, with slide surfaces 55c, 55d provided on engagement support 55b to support projection 47b slidably. Engagement support 55b is an example of a "support" of the invention. Slide surfaces 55c, 55d are flat surfaces that face each other. As shown in FIGS. 11-18, when turning lever 44 turns to swing lever members 55, projections 47b are supported by and slidable on slide surfaces 55c, 55d. Thereby, turning lever 44 can move main insertion hole 42b of funnel holding portion 42 along spindle 41.

As shown in FIG. 5, a body portion 56b of motor 56 is arranged outside a front portion of lower cleaner box 25b, and drive shaft 56a is arranged inside cleaner box 25. Motor 56 is an example of a "drive source" of the invention. An engagement projection 56c is integral with body portion 56b of motor 56 and fitted through a rubber sealing member 58 into a hole 25l of a front portion of lower cleaner box 25b. Sealing member 58 fills a gap between hole 25l and engagement projection 56c.

Motor 56 turns drive shaft 56a in a predetermined angular range in one direction or in the other direction. Specifically, motor 56 inhibits drive shaft 56a from turning in one direction when drive shaft 56a turns a predetermined angle in one direction and inhibits drive shaft 56a from turning in the other direction when drive shaft 56a turns a predetermined angle in the other direction.

Figure 15:
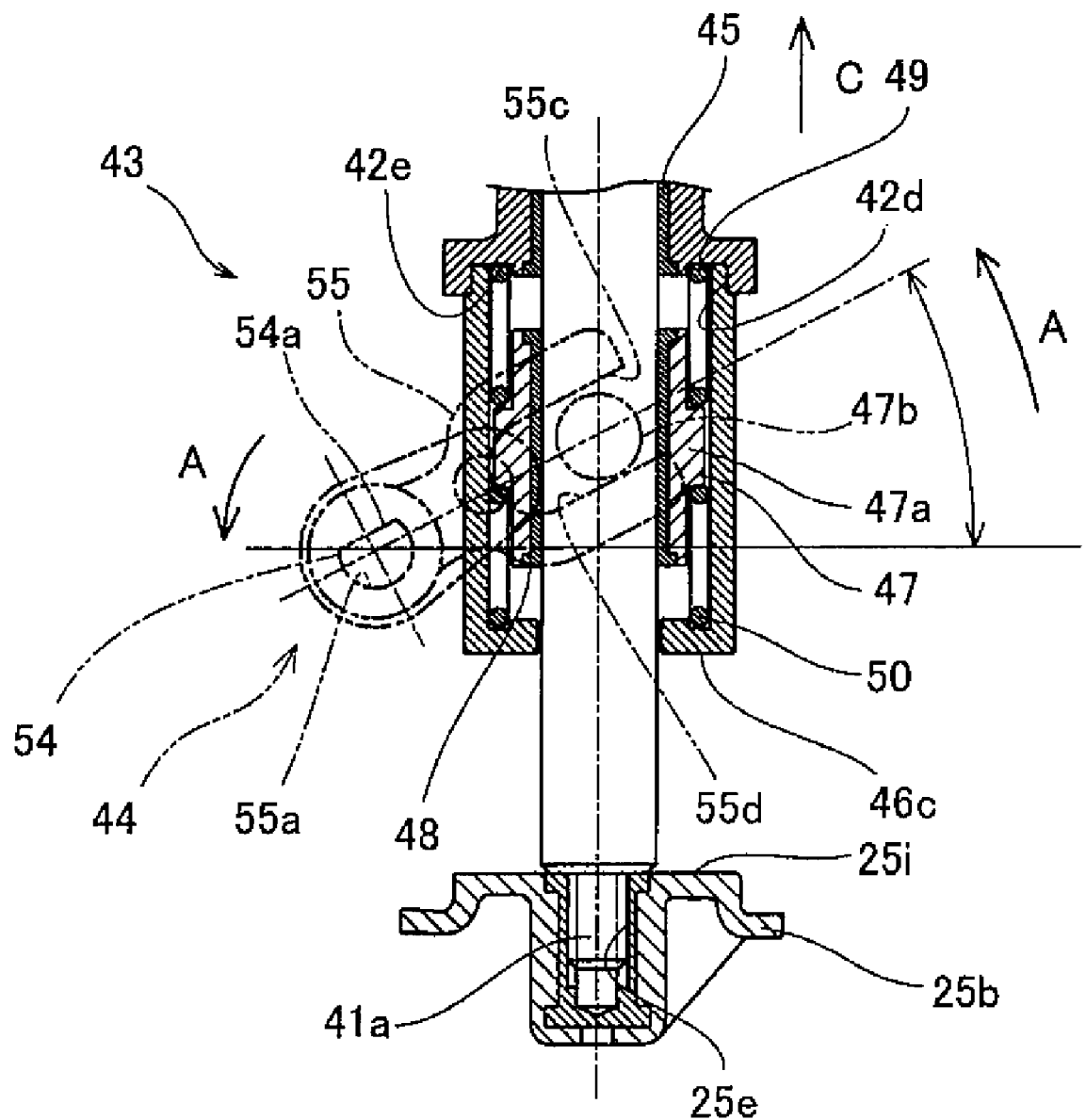
FIG. 15 is a cross sectional view of a moving member of a funnel moving mechanism of FIG. 11.
Figure 17:
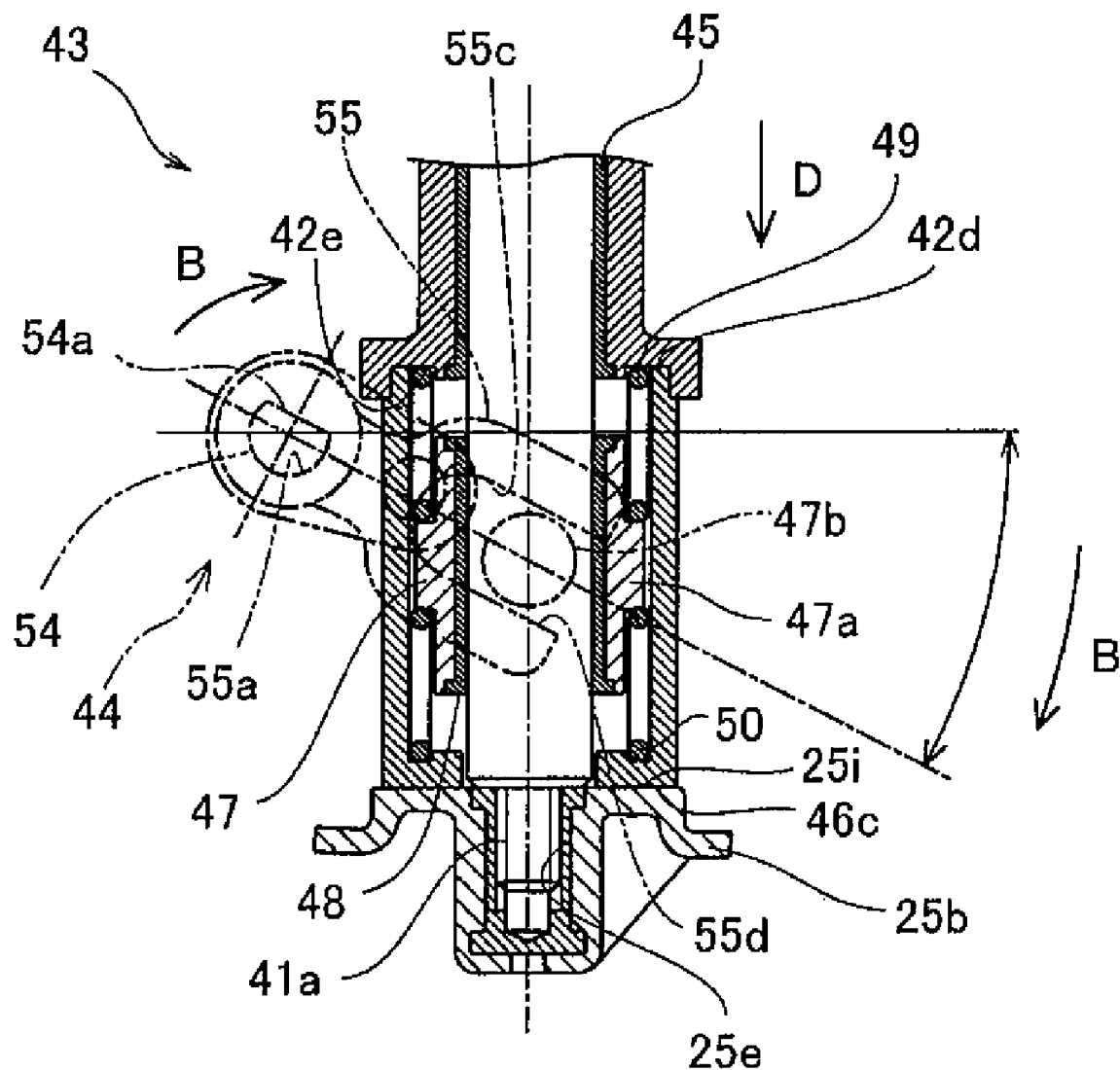
FIG. 17 is a cross sectional view of a moving member of a funnel moving mechanism of FIG. 13.
Figure 18:
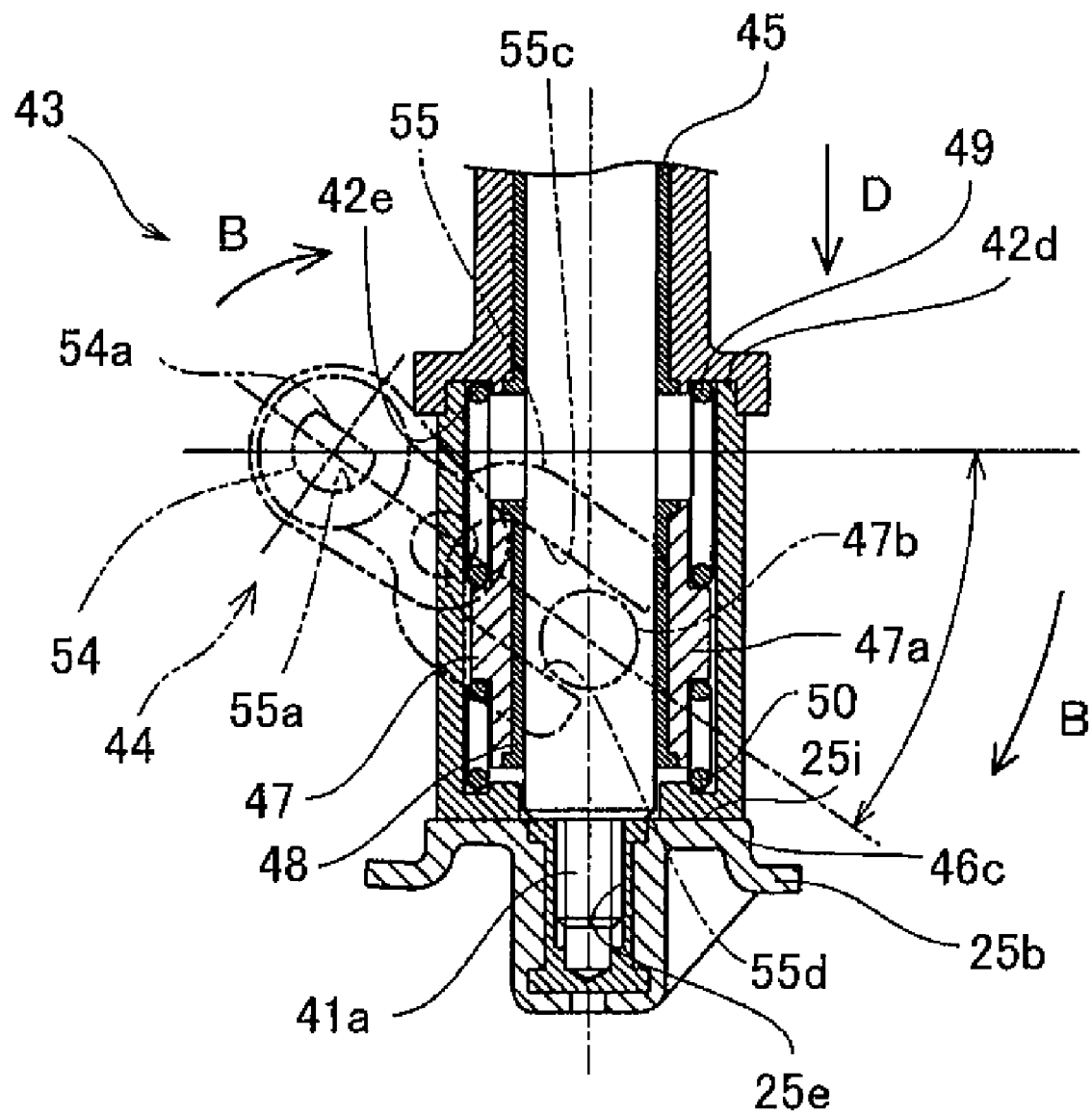
FIG. 18 is a cross sectional view of a moving member of a funnel moving mechanism of FIG. 14.

By constructing moving member 43 and turning lever 44 of funnel moving mechanism 31 and motor 56 in this manner, moving funnels 30 are moved in a direction away from stationary funnels 29 when drive shaft 56a and turning lever 44 are turned in arrow direction A (FIG. 15). Moving funnels 30 are moved in a direction toward stationary funnels 29 when drive shaft 56a and turning lever 44 are turned in arrow direction B (FIG. 17).

Upper abutment 42c of funnel holding section 42 abuts against upper stopper portion 25h of upper cleaner box 25a, as shown in FIGS. 11, 12, 15 and 16, when moving funnels 30 reach the separated positions. Also, slide member 47 is moved in arrow direction C and projections 47b push upper spring material 49 in arrow direction C (see FIGS. 15 and 16). Therefore, when upper abutment 42c abuts against upper stopper portion 25h, upper spring material 49 is compressed and drive shaft 56a is further turned to a predetermined angle in the case where drive shaft 56a is not turned to a predetermined angle due to an error in assembling moving member 43 and turning lever 44 to motor 56.

On the other hand, lower abutment 46c of part receiving portion 46 abuts against lower stopper portion 25i of lower cleaner box 25b, as shown in FIGS. 13, 14, 17 and 18, after moving funnels 30 reach the abutment positions. Also, slide member 47 is moved in arrow direction D and projections 47b push lower spring material 50 in arrow direction D (see FIGS. 17 and 18). Therefore, when moving funnels 30 reach the abutment positions, lower spring material 50 is compressed and drive shaft 56a is further turned to a predetermined angle in the case where drive shaft 56a is not turned to a predetermined angle due to an error in assembling moving member 43 and turning lever 44 to motor 56.

An operation when intake pipes connected to cylinders 17 from cleaner box 25 are switched in length is now described with reference to FIGS. 4-6 and 11-18.

When engine 14 (see FIG. 4) rotates at high speed, the intake pipes are shortened in order to easily get a pulsation effect. That is, when engine 14 rotates at high speed, moving funnels 30 are moved to the separated positions.

Figure 11:
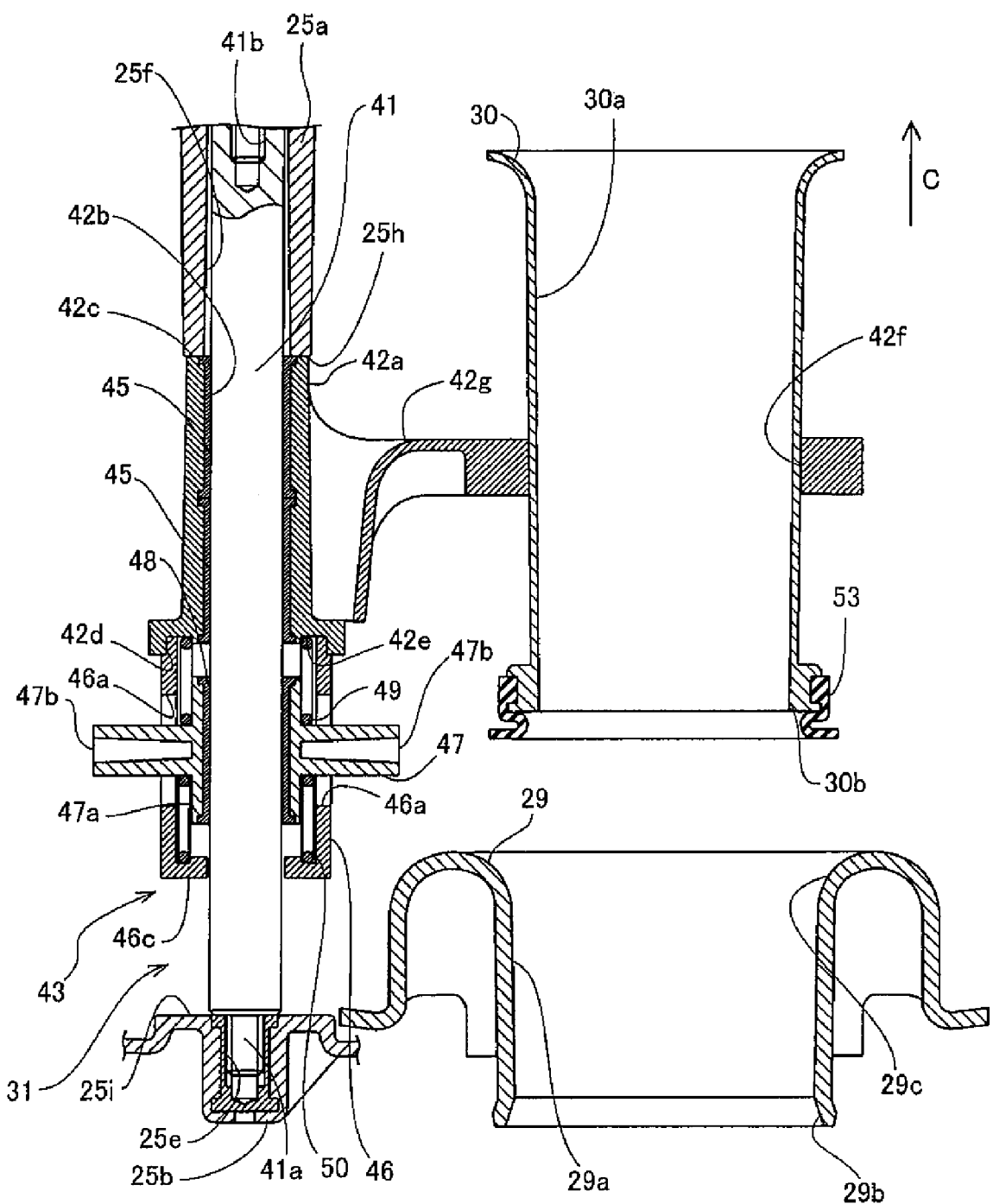
FIG. 11 is a cross sectional view showing a state in which the moving funnels of the motorcycle of FIG. 1 are moved to separated positions.
Figure 12:
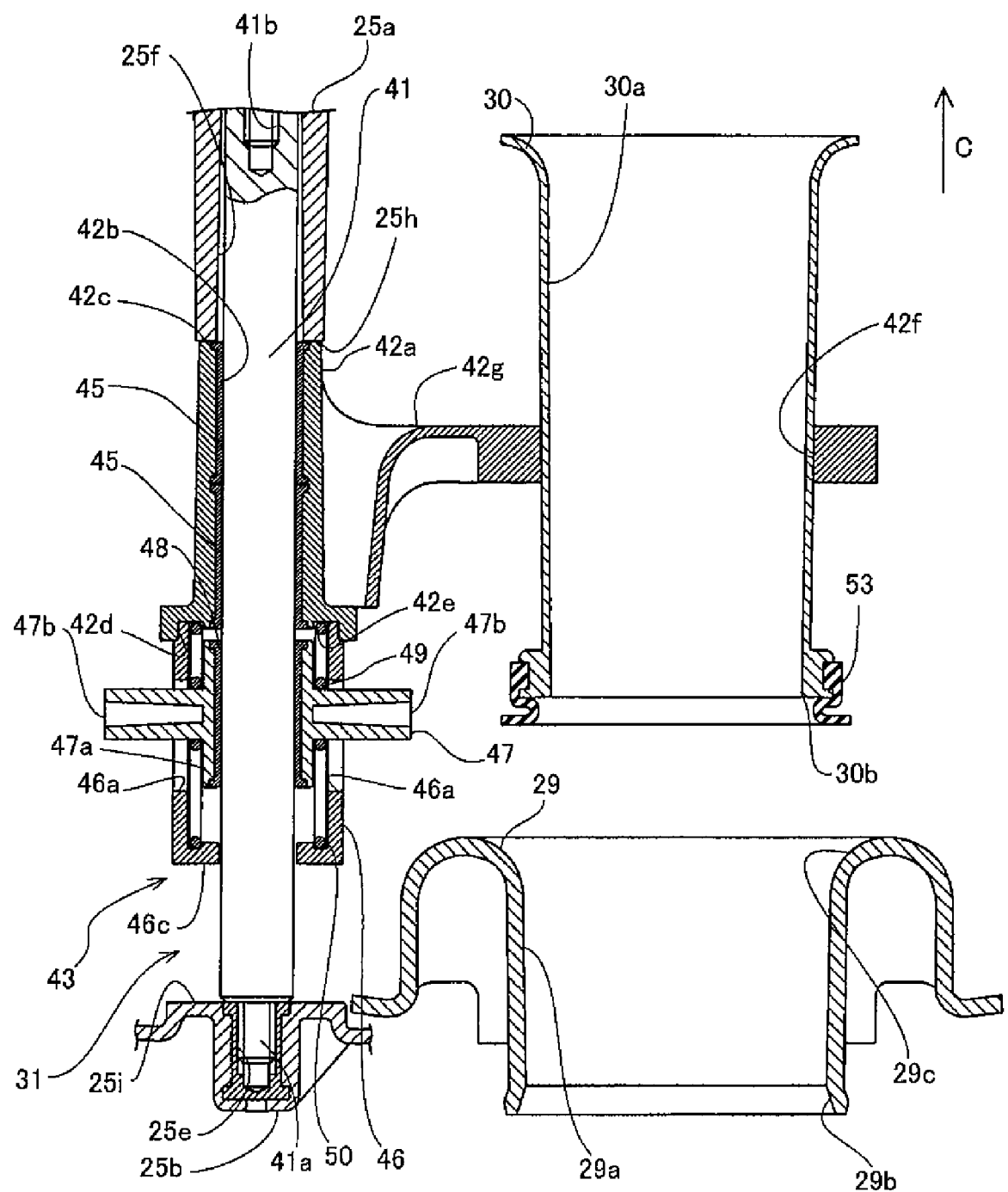
FIG. 12 is a cross sectional view showing a state in which the moving funnels of the motorcycle of FIG. 1 are moved to separated positions.
Figure 16:
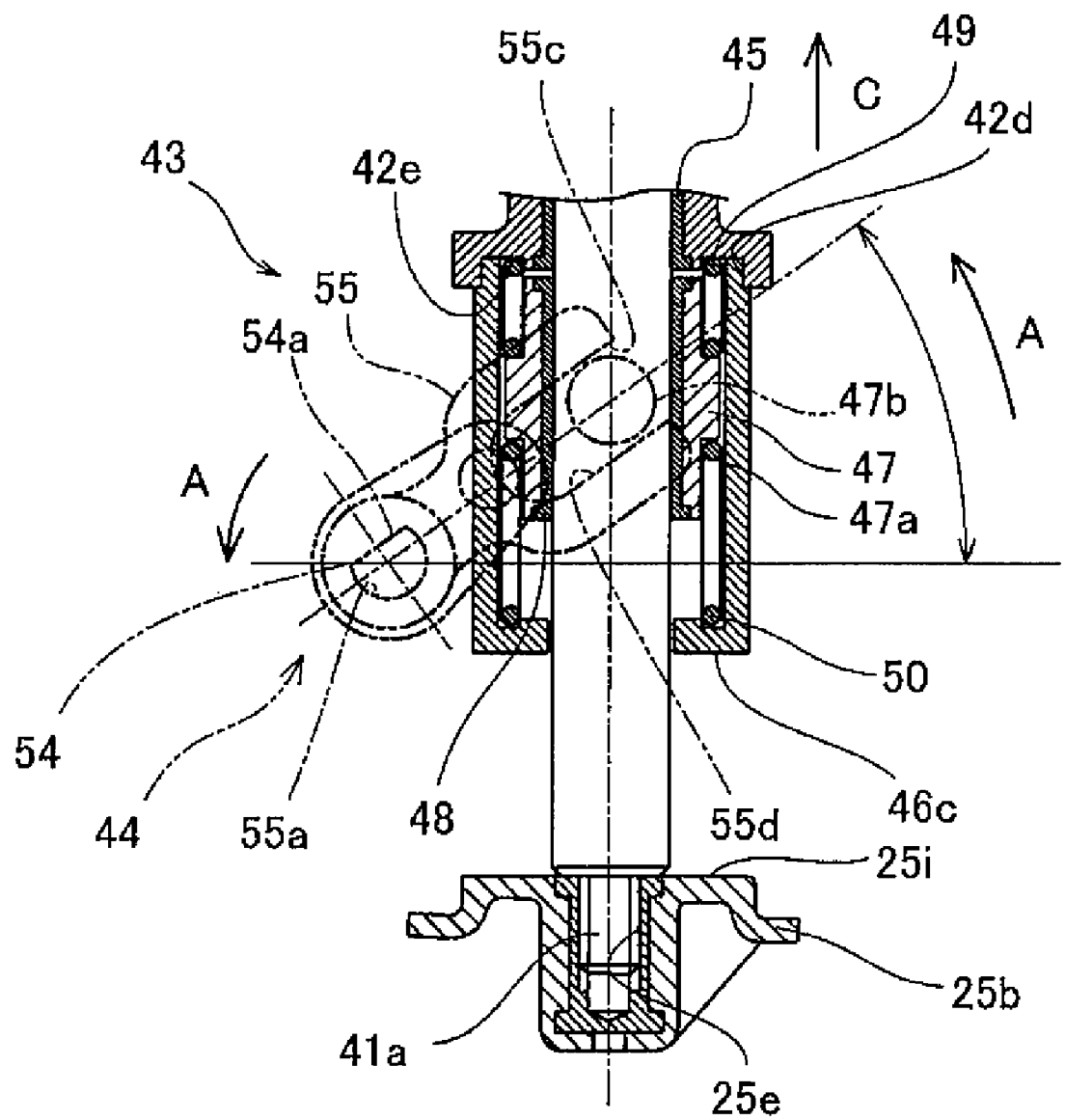
FIG. 16 is a cross sectional view of a moving member of a funnel moving mechanism of FIG. 12.

Specifically, motor 56 turns turning lever 44 of funnel moving mechanism 31 in arrow direction A, whereby slide member 47 is moved along spindle 41 in arrow direction C (FIG. 15). Thereby, bias in arrow direction C is generated on upper spring material 49 whereby moving member 43 and funnel holding section 42 are moved in a straight fashion in arrow direction C (along spindle 41). As shown in FIG. 11, upper abutment 42c of funnel holding section 42 abuts against upper stopper portion 25h, whereby moving funnels 30 are moved to the separated positions. As shown in FIG. 16, turning lever 44 is further turned in arrow direction A, whereby upper spring material 49 is compressed by a predetermined length and projections 47b are pushed up slide surfaces 55d. Drive shaft 56a is turned to a predetermined angle in arrow direction A (see FIG. 16).

Thereby, moving funnels 30 are moved to the separated positions, in a state in which openings 30b of moving funnels 30 are held in parallel to openings 29c of stationary funnels 29. Consequently, when engine 14 rotates at high speed, intake pipes are shortened since they are constituted by stationary funnels 29, throttle bodies 19 and intake ports 18a (see FIG. 4). Intake efficiency is thereby improved since the pressure wave of high pressure is liable to reach openings of intake ports 18a toward cylinders 17 when intake valves 20a are opened.

When engine 14 rotates at low speed, the intake pipes are lengthened in order to easily get a pulsation effect. That is, when engine 14 rotates at low speed, moving funnels 30 are moved to the abutment positions.

Figure 13:
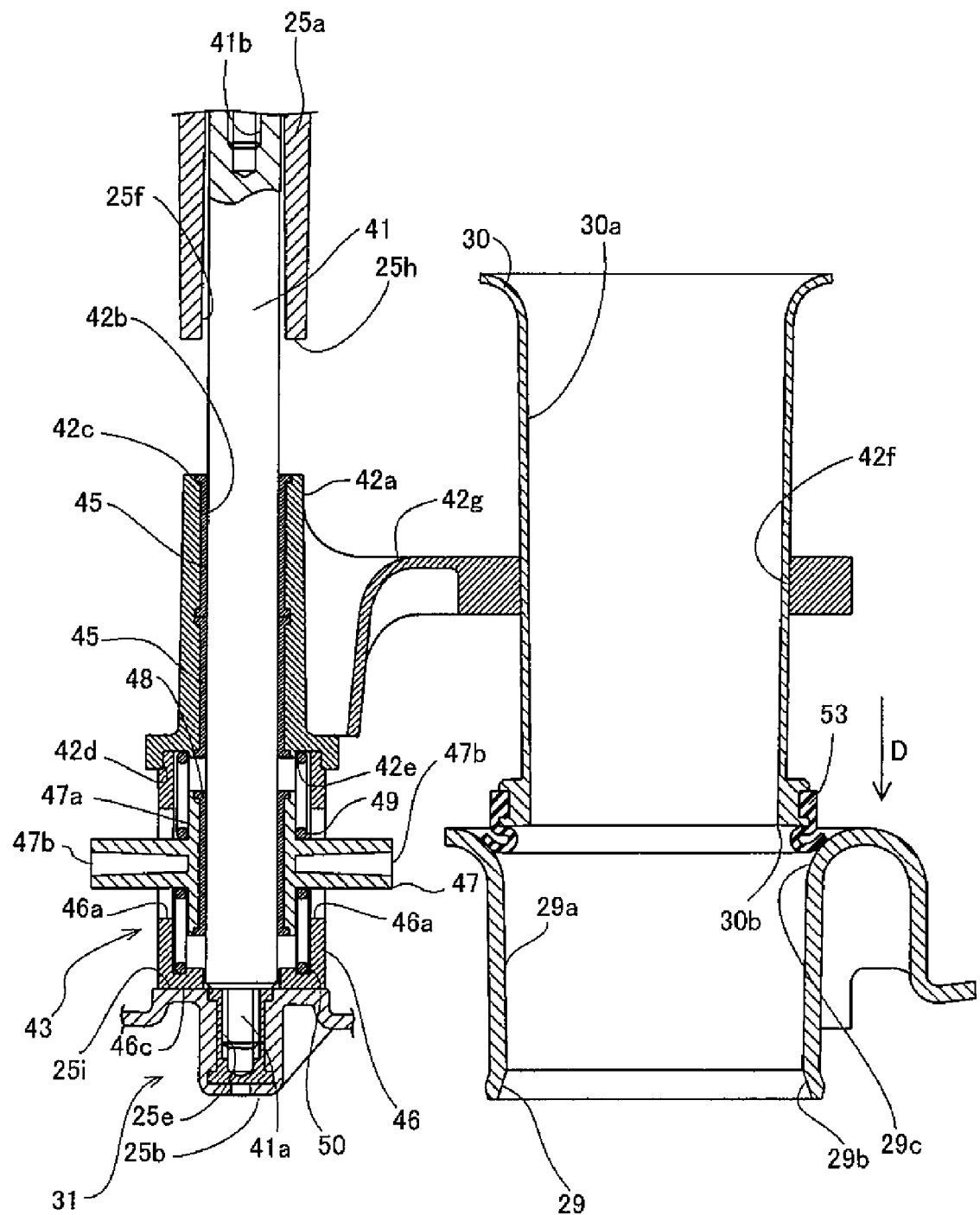
FIG. 13 is a cross sectional view showing a state in which the moving funnels of the motorcycle of FIG. 1 are moved to abutment positions.
Figure 14:
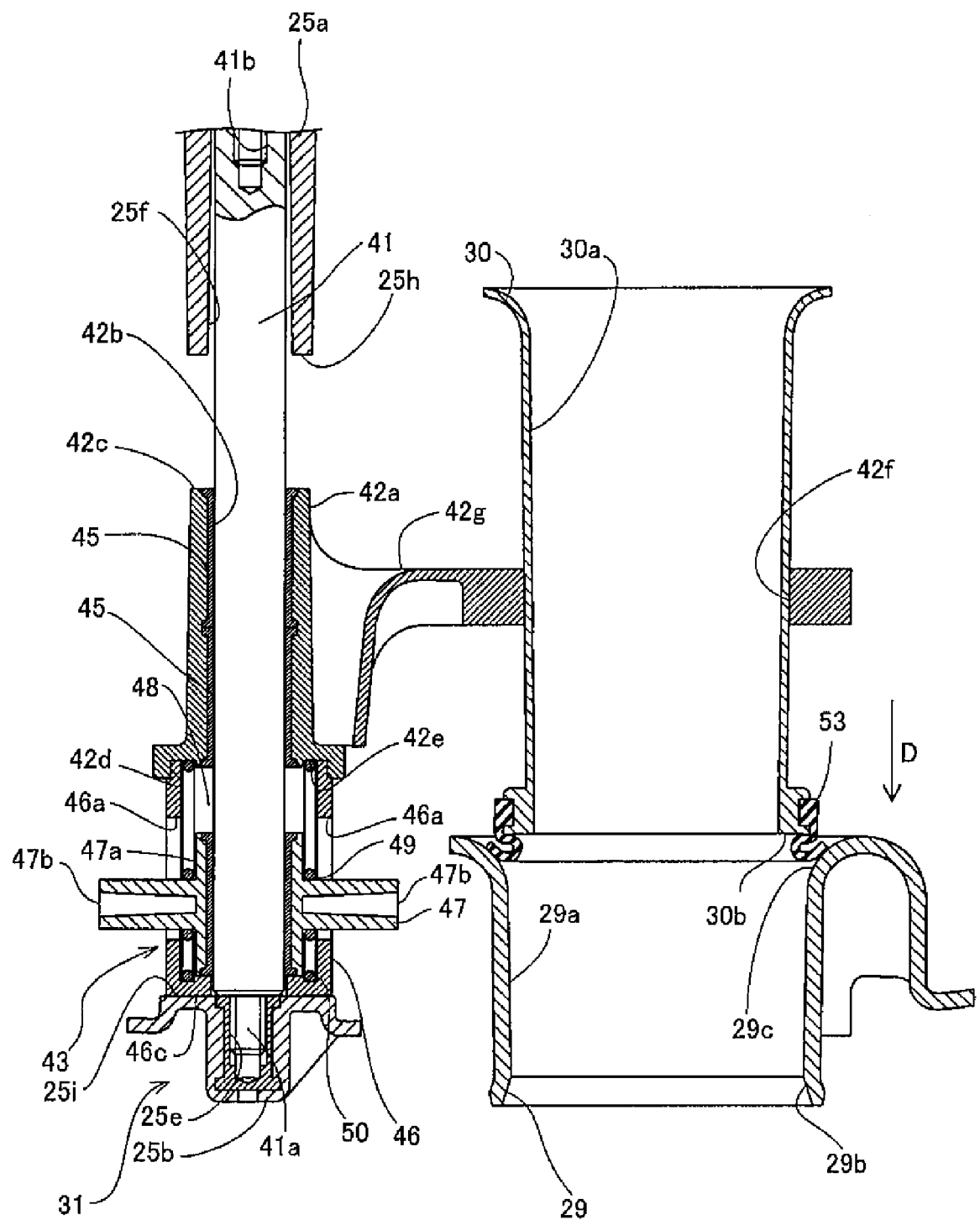
FIG. 14 is a cross sectional view showing a state in which the moving funnels of the motorcycle of FIG. 1 are moved to abutment positions.

Specifically, motor 56 turns turning lever 44 of funnel moving mechanism 31 in arrow direction B, whereby slide member 47 is moved along spindle 41 in arrow direction D (see FIG. 17). Thereby, bias in arrow direction D is generated on upper spring material 49, whereby moving member 43 and funnel holding section 42 are moved in a straight fashion in arrow direction D (along spindle 41). As shown in FIG. 13, openings 30b of moving funnels 30 abut against openings 29c of stationary funnels 29 when moving funnels 30 are moved to the abutment positions. When turning lever 44 is further turned in arrow direction B, lower spring material 50 is compressed by a predetermined length and projections 47b are pushed down by slide surfaces 55c. Drive shaft 56a is turned to a predetermined angle in arrow direction B (see FIG. 18).

Thereby, moving funnels 30 are moved to the abutment positions, in a state in which openings 30b of moving funnels 30 are held in parallel to openings 29c of stationary funnels 29. Consequently, when engine 14 rotates at high speed, the intake pipes are lengthened since they are constituted by moving funnels 30, stationary funnels 29, throttle bodies 19 and intake ports 18a (see FIG. 4). Intake efficiency is thereby improved since the pressure wave of high pressure is liable to reach openings of intake ports 18a toward cylinders 17 when intake valves 20a are opened.

According to the embodiment, as described above, opened holes 42k of funnel holding section 42 permit passage of air on an upstream side to a downstream side, whereby when openings 30b of moving funnels 30 are separated from openings 29c of stationary funnels 29, air passing outside moving funnels 30 from upstream of moving funnels 30 is caused by opened holes 42k to flow downstream toward stationary funnels 29. Thereby, since flow of air from an upstream side to a downstream side of funnel holding section 42 is not obstructed by funnel holding section 42, there is no decrease in intake efficiency when moving funnels 30 are separated from stationary funnels 29. Also, since moving funnels 30 move straight between the separated and abutment positions, flow of air passing through moving funnels 30 and drawn by stationary funnels 29 is made straight even when openings 30b of moving funnels 30 are separated from openings 29c of stationary funnels 29, thereby further inhibiting obstruction of the flow of air. Consequently, a decrease in intake efficiency is further suppressed when moving funnels 30 are separated from stationary funnels 29.

Also, according to the embodiment, first and second connection arm portions 42g and 42h of funnel holding section 42 connect moving funnels 30 together with opened holes 42k therebetween. Thus, when stationary funnels 29 and moving funnels 30 are provided in plural, opened holes 42k are readily formed by first and second connection arm portions 42g and 42h, so that flow of air is not obstructed by funnel holding section 42.

Also, according to the embodiment, by providing opened holes 42k so that air upstream of moving funnels 30 (funnel holding section 42), which air does not pass through air passages 30a of moving funnels 30 after passing air filter section 26, is permitted to pass downstream of moving funnels 30 when moving funnels 30 are separated from stationary funnels 29, air upstream of moving funnels 30 can be moved downstream not only through air passages 30a (openings 30b) of moving funnels 30, but also through opened holes 42k, so that flow of air is not obstructed. Decrease in intake efficiency is thereby suppressed when moving funnels 30 are separated from stationary funnels 29.

Also, according to the embodiment, main insertion hole 42b and funnel mount portions 42f are provided on funnel holding section 42 such that main insertion hole 42b moves along spindle 41 to readily move moving funnels 30 held on funnel mount portions 42f of funnel holding section 42 in a straight fashion.

Also, according to the embodiment, first and second connection arm portions 42g and 42h are formed as rods with a plurality of grooves 42i, 42j extending in the direction of arm portions 42g and 42h. Arm portions 42g and 42h are thus notch-shaped in cross section and ensure a certain degree of stiffness with a reduced cross sectional area. Funnel holding section 42 is thereby lightened.

Also, according to the embodiment, by inserting sub-spindle 25j, which is integrally formed on lower cleaner box 25b, into sub-insertion hole 42l, funnel holding section 42 is supported by sub-spindle 25j as well as spindle 41, so that funnel holding section 42 and moving funnels 30 are inhibited from turning about spindle 41.

Also, according to the embodiment, by providing upper stopper portion 25h and upper abutment 42c on funnel holding section 42, moving funnels 30 are stopped in the separated positions.

Also, according to the embodiment, upper spring material 49 and lower spring material 50 are compressed by a predetermined length when upper abutment 42c abuts against upper stopper portion 25h and when openings 30b of moving funnels 30 abut against openings 29c of stationary funnels 29. Thus, when motor 56 moves funnel holding section 42 upward (arrow direction C) such that upper abutment 42c abuts upper stopper portion 25h, upper spring material 49 is compressed to readily absorb the assembling error of motor 56 and funnel holding section 42 and the driving error of motor 56. And, when motor 56 moves funnel holding section 42 downward (arrow direction D) such that openings 30b of moving funnels 30 abut openings 29c of stationary funnels 29, lower spring material 50 is compressed to readily absorb the assembling error of motor 56 and funnel holding section 42 and the driving error of motor 56. Thereby, drive shaft 56a of motor 56 can be turned to a predetermined angle.

Also, according to the embodiment, projections 47b are provided on slide member 47 of moving member 43 mounted to funnel holding section 42, and engagement support 55b having slide surfaces 55c, 55d is provided on lever member 55. Thereby, main insertion hole 42b of funnel holding section 42 can be moved straight along spindle 41 when turning lever 44 is turned by drive shaft 56a, and projections 47b slide relative to slide surfaces 55c, 55d when moving funnels 30 are moved between separated and abutment positions.

Also, according to the embodiment, air passages 30a of moving funnels 30, air passages 29a of stationary funnels 29, and air passages 19a of throttle bodies 19, are formed and connected in a substantially straight fashion. Air passing to intake ports 18a of engine 14 from moving funnels 30 and stationary funnels 29 thereby flows in a straight fashion, so that air flow is not obstructed and intake efficiency is not decreased.

Also, according to the embodiment, cleaner box 25 is arranged above a V-shaped space defined by the cylinders of engine 14. Intake ports 18a are opened to the V-shaped space, so that openings 29c of stationary funnels 29 are provided in a straight fashion toward intake ports 18a.

Also, according to the embodiment, duct section 28 forms a passage through which air flows into cleaner box 25 from rearward in the travel direction, so that air is readily fed to air filter section 26, which is arranged rearward in the travel direction, so that it is difficult for air to pass directly thereinto.

The embodiments disclosed herein are exemplary in all respects and not limitative. The scope of the invention is not limited by the described embodiment, and includes all changes within the scope of the claims.

For example, while a motorcycle is described as an example of a vehicle provided with a funnel, the invention is not limited thereto and is also applicable to other vehicles such as automobiles, three-wheelers, ATVs (All Terrain Vehicles), etc.

Also, while perforated opened holes permitting air upstream of the moving funnels to pass downstream of the moving funnels have been described, a notch-shaped passage for passing air downstream from upstream of the moving funnels may also be provided.

Also, while perforated opened holes surrounded by connection arm portions in the form of rods have been described, a hole or a notch-shaped air passage may alternatively be provided on a flat-plate shaped funnel holding section.

Also, while the embodiment shows application of the invention to a vehicle with a four-cylinder engine mounted thereon, the invention is not limited thereto but also applicable to vehicles such as vehicles with other multi-cylinder engines than a four-cylinder engine, and vehicles with a single-cylinder engine.

Also, while a stationary funnel integral with a lower cleaner box has been described, the stationary funnel may be formed separately from the cleaner box.

Also, while the moving funnels and funnel holding section have been described as separate parts, the funnel holding section and moving funnels may be molded integrally.

Also, while grooves provided on under surfaces of the connection arm portions have been described, the grooves may be provided on upper surfaces or upper and lower surfaces of the connection arm portions.

Also, while a single sub-spindle has been described, plural sub-spindles may be provided.

Also, while flat portions have been described as inhibiting the lever members of the turning member from idling relative to the turning shaft, a plurality of projections portions subjected to knurling) may alternatively be provided on the turning shaft.

The invention claimed is:

1. A vehicle comprising:
    an engine having an intake port;
    a stationary funnel through which air is led to the intake port;
    a moving funnel arranged movably on an intake side of the stationary funnel and cooperating with the stationary funnel to lead air to the intake port; and
    a funnel holding section holding the moving funnel and including an air passage, wherein
    the moving funnel is moved in a straight fashion between a first position in which an opening of the moving funnel is separated from an opening of the stationary funnel, and a second position in which the opening of the moving funnel abuts the opening of the stationary funnel, and
    the air passage of the funnel holding section passes air on an upstream side toward a downstream side.

2. The vehicle according to claim 1, comprising a plurality of stationary funnels and moving funnels, wherein
    the funnel holding section includes a plurality of connections to which the plurality of moving funnels are connected, and
    the air passage is formed between the plurality of connections.

3. The vehicle according to claim 2, further comprising a first spindle extending straight in a direction in which air passages of the stationary funnels extend, and
    wherein the funnel holding section includes a first insertion hole into which the first spindle is inserted movably, and a plurality of funnel mount portions, to which the plurality of moving funnels are mounted.

4. The vehicle according to claim 3, wherein the plurality of connections include a first connection to which the first insertion hole and the plurality of funnel mount portions are connected, and a second connection to which the plurality of adjacent funnel mount portions are connected, and
    the air passages are provided in a region surrounded by the first and second connections.

5. The vehicle according to claim 4, wherein grooves extend in a direction of the first and second connections.

6. The vehicle according to claim 3, further comprising a case section in which the moving funnels, stationary funnels and the funnel holding section are arranged, and
    a second spindle provided on the case section substantially in parallel to the first spindle,
    wherein the funnel holding section further comprises a second insertion hole into which the second spindle is inserted.

7. The vehicle according to claim 6, wherein the second spindle is provided integrally on the case section.

8. The vehicle according to claim 6, wherein the case section comprises upper and lower case sections.

9. The vehicle according to claim 8, wherein the case section comprises an upper stopper portion for stopping the moving funnels in the first position, and
    the funnel holding section comprises an upper abutment on a side of the first insertion hole toward the upper case section to abut against the upper stopper portion when the moving funnels are positioned in the first position.

10. The vehicle according to claim 9, further comprising a drive source for driving the funnel holding section, and upper and lower spring members arranged between the funnel holding section and the drive source, and wherein the upper spring member is compressed when the upper abutment of the funnel holding section abuts against the upper stopper portion, and the lower spring member is compressed in the case when the openings of the moving funnels abut the openings of the stationary funnels.

11. The vehicle according to claim 3, further comprising:
a drive source including a drive shaft;
a turning lever having one end connected to the drive shaft, and which moves the first insertion hole of the funnel holding section along the first spindle; and
a moving member between the turning lever and the funnel holding section, wherein the moving member includes an engagement for engagement with the turning lever, and
the turning lever includes a support having a slide surface that supports the engagement slidably.

12. The vehicle according to claim 1, wherein the air passage of the funnel holding section comprises a hole or a notch opened in a direction of air flow.

13. The vehicle according to claim 1, further comprising an air filter section having an opening on the intake side of the stationary funnel,
the opening of the air filter section being provided along a direction in which an air passage of the stationary funnel extends, and in a position away from the funnel holding section, and
the funnel holding section spreading in a direction perpendicular to the opening of the air filter section, and in a direction in which the opening of the stationary funnel on the intake side spreads.

14. The vehicle according to claim 1, further comprising:
a throttle body arranged between the intake port of the engine and an opening of the stationary funnel toward the engine,
wherein an air passage of the moving funnel, an air passage of the stationary funnel, and an air passage of the throttle body, are formed substantially straight.

15. The vehicle according to claim 1, comprising:
a plurality of stationary funnels and moving funnels, respectively, are provided in plural; and
a case section in which the plurality of moving funnels, the plurality of stationary funnels, and the funnel holding section are arranged, and
the engine comprising a plurality of cylinders, and
a plurality of cylinder heads mounted to the respective cylinders and arranged to provide a V-shaped space above the engine, and
the case section being arranged above the V-shaped space of the engine.

16. The vehicle according to claim 1, further comprising:
a case section in which the moving funnel, the stationary funnel, and the funnel holding section are arranged,
an air filter section arranged rearwardly of the case section in a travel direction, and
a duct section, through which air is caused to flow into the case section from rearward in the travel direction.

* * * * *